(12) United States Patent
Nishida et al.

(10) Patent No.: US 8,329,067 B2
(45) Date of Patent: Dec. 11, 2012

(54) METHOD OF PRODUCING COLOR FILTER AND COLOR FILTER

(75) Inventors: Tomonori Nishida, Tokyo-to (JP); Hiroyuki Honda, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 509 days.

(21) Appl. No.: 12/295,643

(22) PCT Filed: Apr. 2, 2007

(86) PCT No.: PCT/JP2007/057383
§ 371 (c)(1),
(2), (4) Date: Oct. 1, 2008

(87) PCT Pub. No.: WO2007/116854
PCT Pub. Date: Oct. 18, 2007

(65) Prior Publication Data
US 2009/0114888 A1 May 7, 2009

(30) Foreign Application Priority Data
Apr. 3, 2006 (JP) ................................. 2006-102569

(51) Int. Cl.
*G02B 5/23* (2006.01)
*G02F 1/1335* (2006.01)
*B05D 5/00* (2006.01)

(52) U.S. Cl. .................... 252/586; 106/31.28; 106/31.6; 349/106; 359/891; 427/162; 427/256; 428/220; 523/160; 523/161; 523/400; 523/406

(58) Field of Classification Search ............... 252/586; 427/256, 162; 428/195.1, 220; 524/548; 525/190; 523/160, 161, 400, 406; 106/31.28, 106/31.6; 349/106; 359/891
See application file for complete search history.

(56) References Cited

U.S. PATENT DOCUMENTS

2004/0048950 A1* 3/2004 Nishida et al. ............... 523/160
2004/0197682 A1* 10/2004 Sonehara et al. ............... 430/7
(Continued)

FOREIGN PATENT DOCUMENTS
JP 59-075205 4/1984
(Continued)

OTHER PUBLICATIONS
International Search Report; PCT/JP2007/057383.

*Primary Examiner* — Bijan Ahvazi
(74) *Attorney, Agent, or Firm* — Ladas & Parry LLP

(57) ABSTRACT

A method of producing a color filter by using the ink jet system. The method includes a step of preparing a specific ink-jet ink for color filter, the ink containing a pigment, a pigment dispersing agent, a binder forming system and a solvent, a step of forming an R ink layer, a G ink layer and a B ink layer respectively by the ink jet system and a step of curing each of the ink layer to form an R pixel, a G pixel and a B pixel, which each have an average film thickness range from 1.5 μm to 2.5 μm and a film thickness distribution range from 1.0 μm to 3.0 μm, wherein the ratio of the total area of the regions having a film thickness of 1.5 μm or less or 2.5 μm or more in one pixel is 5% or less.

11 Claims, 6 Drawing Sheets

U.S. PATENT DOCUMENTS

2006/0052473 A1 * 3/2006 Takabayashi ................ 522/71

FOREIGN PATENT DOCUMENTS

| | | |
|---|---|---|
| JP | 10-152627 | 6/1998 |
| JP | 2000-214319 A | 8/2000 |
| JP | 2003-066223 | 3/2003 |
| JP | 2004-010838 | 1/2004 |
| JP | 2004-012755 A | 1/2004 |
| JP | 2004-339331 | 12/2004 |
| JP | 2005-232432 | 9/2005 |
| JP | 2005-283892 A | 10/2005 |
| JP | 2006-010876 | 1/2006 |
| JP | 2006-045262 | 2/2006 |
| JP | 2006-309171 | 11/2006 |
| JP | 2007-065155 | 3/2007 |

* cited by examiner

METHOD OF PRODUCING COLOR FILTER AND COLOR FILTER

TECHNICAL FIELD

The present invention relates to a method of producing a color filter, the method comprising forming pixels having a predetermined pattern by using the ink jet method, and relates to a color filter in which pixels having a predetermined pattern are formed on a substrate.

To explain in more detail, the present invention relates to a method of producing a color filter by the ink jet method, the method enabling the production of a color filter equal or almost equal in color characteristics and brightness to a color filter which is formed by the spin coating method and having pixels with an average film thickness enough to obtain sufficient color characteristics, and to a color filter.

BACKGROUND ART

Examples of color filters include color filters used in image output devices such as liquid crystal display devices and color filters used for image input devices such as solid-state image sensing devices. A typical example of the structure of the color filter used in liquid crystal display devices will be explained with reference to FIGS. 1A and 1B.

Generally, a color liquid crystal display device (101) has a structure in which, as shown in FIG. 1A, a color filter 1 is disposed opposite to an electrode substrate 2 such as a TFT substrate to form a clearance 3 of about 1 to 10 μm, a liquid crystal compound L is filled in the clearance 3 and the surroundings of these parts are sealed with a seal material 4. The color filter 1 has a structure in which a black matrix (hereinafter referred to as BM as the case may be) layer 6 formed with a predetermined pattern to shield the boundary portion between pixels, a pixel section 7 in which plural colors (usually, three primary colors, that is, R (red), G (green) and B (blue)) are arranged in the predetermined order, a protective film 8 and a transparent electrode film 9 are laminated in this order on a transparent substrate 5. An orientation film 10 is disposed on the inside surface sides of the color filter 1 and the electrode substrate 2 disposed opposite to the color filter 1. Also, a spacer is disposed in the clearance 3 to keep a constant and uniform cell gap between the color filter 1 and the electrode substrate 2. As the spacer, pearls 11 each having a fixed particle diameter are dispersed, or columnar spacers 12 having a height corresponding to the cell gap as shown in FIG. 1B are formed on the inside surface side of the color filter and in the region where it is overlapped on the position at which the black matrix layer 6 is formed. Then, the light transmittance of each of the pixels differently colored or the transmittance of the liquid crystal layer disposed behind the color filter is controlled to thereby obtain a color image.

Examples of the usual method of forming the pixels of the color filter in the form of a predetermined pattern include the dying method. In this dying method, first a water-soluble polymer material which is a dying material is formed on a glass substrate and then, patterned in a desired form by the photolithographic process. Then, the pattern obtained is dipped in a dying bath to obtain a colored pattern. These processes are repeated three times to form R, G and B pixels. Also, as other methods, there is a pigment dispersion method. In this method, a coating solution (pigment dispersion solution) containing a pigment which is a colorant and an alkali-soluble photocurable resin is applied to a substrate to form a photosensitive resin layer. This photosensitive resin layer is subjected to the photolithography process to form a predetermined pattern, thereby obtaining a monochromatic pattern. These processes are repeated three times to form R, G and B pixels. Further examples of the formation method include the electrodeposition method and the printing method in which a pigment is dispersed in a heatcurable resin to carrying out printing three times for forming R, G and B pixels and then, the resin is thermally cured.

However, any of these methods has the problem that it is necessary to repeat the same process three times to obtain three colors of R, G and B, thus leading to high cost and also, decreased yield because the same process is repeated.

As the method of producing a color filter which method is developed to solve these problems, a method is proposed in Patent Document 1 in which ink is sprayed on the surface of a substrate by the ink jet system to form a pixel.

When pixels are formed in the region enclosed in the black matrix layer on the transparent substrate by the ink jet method, pixels arranged at the opening part enclosed by the black matrix layer each have a part lower in thickness along the peripheral edge or its vicinity thereof and also, have the highest thickness on a position closer to the center side thereof than the part where the thickness is lower, or on the contrary, have the higher thickness along the peripheral edge or its vicinity thereof and also, have the lowest thickness on a position closer to the center side thereof than the part where the thickness is higher, or further have a concave-convex surface, resulting in the production of non-uniform pixels, depending on the affinity of the ink to the surface of the black matrix layer, the height of the black matrix layer and the amount of ink to be jetted.

Patent Document 1: Japanese Patent Application Laid-Open No. 59-75205

SUMMARY OF THE INVENTION

Problems to be Solved by the Invention

Pixels having non-uniform shapes like pixels formed by the ink jet method tend to be more reduced in brightness than flat pixels having the same average film thickness and the same structural ratio of materials, for example, the pixels formed by the spin coating method. It is therefore required to form pixels having a shape as uniform as possible when these pixels are formed by the ink jet method.

An improvement in brightness can be made by decreasing the average film thickness of pixels or by changing the ratio of materials or the type of material to be compounded in the pixels. Such a method offers difficulties in realizing a color filter having the same or almost the same color characteristics as the color filter having flat pixels obtained by the spin coating method.

In view of this situation, the present invention has been made and it is an object of the present invention to provide a method of producing a color filter by using the ink jet system, the method comprising forming a color filter having the same or almost the same color characteristics and brightness as the color filter having flat pixels obtained by the spin coating method.

Also, another object of the present invention is to provide a color filter having the same or almost the same color characteristics and brightness as the color filter having flat pixels obtained by the spin coating method.

Means for Solving the Problem

A method of producing a color filter according to the present invention comprises a step (A) of preparing an ink-jet ink for color filter, the ink containing a pigment, a pigment dispersing agent, a binder forming system and a solvent wherein the solvent contains, as its main solvent, a solvent component having a boiling point of 180° C. to 260° C. and a vapor pressure of 0.5 mm Hg or less at ordinary temperature in a ratio of 60% by weight or more based on the total amount of the solvent, the ratio (P/V ratio) of the weight of the pigment and the sum of the weights of the pigment dispersing agent and the binder forming system is 0.5 to 1.0 when an R pixel is formed, 0.5 to 1.2 when a G pixel is formed and 0.3 to 0.5 when a B pixel is formed and the concentration of a solid based on the total weight of the ink is 15% by weight to 25% by weight, a step (B) of forming an R ink layer, a G ink layer and a B ink layer respectively by making the R pixel forming ink, the G pixel forming ink and the B pixel forming ink obtained by the step (A) selectively adhere on each predetermined area of a transparent substrate by the ink-jet method and a step (C) of curing each of the ink layer to form an R pixel, a G pixel and a B pixel which each have an average film thickness range from 1.5 μm to 2.5 μm and a film thickness distribution range from 1.0 μm to 3.0 μm, wherein the ratio of the total area of the regions having a film thickness of 1.5 μm or less or 2.5 μm or more in one pixel is 5% or less.

The method of producing a color filter according to the present invention can produce a color filter having the same or almost the same color characteristics and brightness as the color filter having flat pixels obtained by the spin coating method in the same condition as to the average film thickness and the structural ratio of materials. Also, since the ink jet method is used, high productivity is attained and a reduction in cost and an improved yield can be realized.

Also, in the method of producing a color filter according to the present invention, the pigment dispersing agent preferably contains a polyethyleneimine derivative or a polyallylamine derivative from the viewpoint of preventing sinking at the edge of BM in the sectional shape of a pixel of a color filter.

Also, in the method of producing a color filter according to the present invention, each of the pixel preferably has a film thickness distribution range from 1.5 μm to 2.5 μm from the viewpoint of, particularly preventing a reduction in the brightness.

Also, in the method of producing a color filter according to the present invention, the color filter preferably contains a black matrix layer having a height of 2.0 μm to 3.0 μm from the viewpoint of easily obtaining a pixel having the shape specific to the present invention.

Also, in the method of producing a color filter according to the present invention, the ink-jet ink for color filter preferably contains a leveling agent from the viewpoint of reducing a rise of the end portion of a film when the film is formed. The leveling agent is usually added after the pigment dispersing step.

Also, a color filter according to the present invention comprises at least a transparent substrate and pixels containing a pigment, a pigment dispersing agent and a binder, wherein each of the pixels has an average film thickness range from 1.5 μm to 2.5 μm and a film thickness distribution range from 1.0 μm to 3.0 μm, wherein the ratio of the total area of the regions having a film thickness of 1.5 μm or less or 2.5 μm or more in one pixel is 5% or less.

Even in the case of using a production method such as the ink jet method, which tends to form pixels having a non-uniform shape because of technical restriction, the color filter to be obtained has the same or almost the same brightness as the color filter having flat pixels produced in the same condition as to the average film thickness and the structural ratio of materials.

Also, in the color filter of the present invention, the distribution of film thickness of each of the pixel is preferably in a range from 1.5 μm to 2.5 μm from the viewpoint of preventing the reduction in brightness.

Also, the color filter of the present invention is preferably has a black matrix layer having a height of 2.0 μm to 3.0 μm from the viewpoint of easily obtaining pixels having a shape specific to the present invention.

Also, in the color filter of the present invention, the pixel may have a leveling agent. Such a color filter is preferable from the viewpoint that it is reduced in the rise of the end part of the pixel.

Effect of the Invention

According to the method of producing a color filter in the present invention, a color filter having a flattened pixel can be formed though the ink jet method is used and also, the obtained color filter has sufficient brightness as compared with a color filter having pixels obtained by the spin coating method in the same condition as to the average film thickness and the structural ratio of materials.

Also, though the color filter according to the present invention has pixels having a non-uniform shape, the color filter according to the present invention has the same or almost the same sufficient color characteristics and brightness as a color filter having flat pixels produced in the same condition as to the average film thickness and the structural ratio of materials. Strict restrictions have been imposed on the method of producing pixels in order to form pixels having high flatness so far. However, the color filter according to the present invention has a high degree of freedom in selecting a production method.

EXPLANATION OF THE SYMBOLS

Figure 1A:
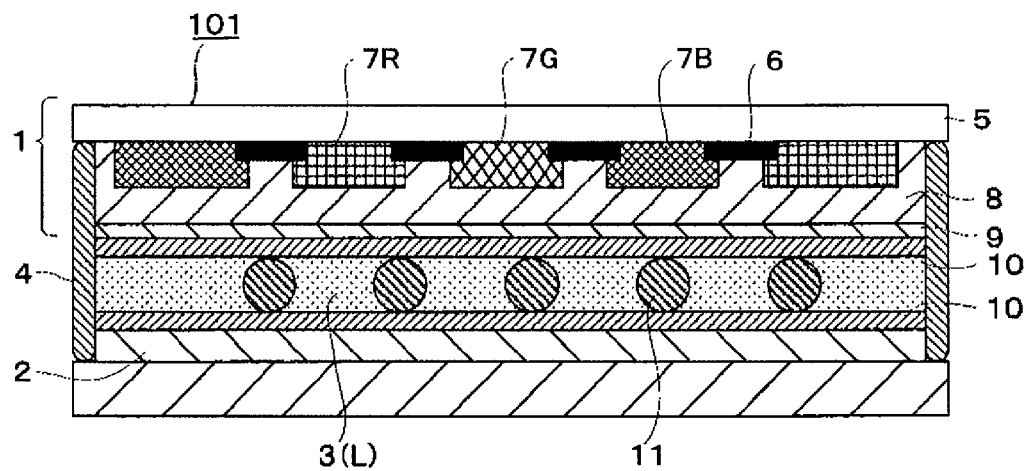
FIG. 1A is a schematic sectional view showing an example of a liquid crystal panel.
Figure 1B:
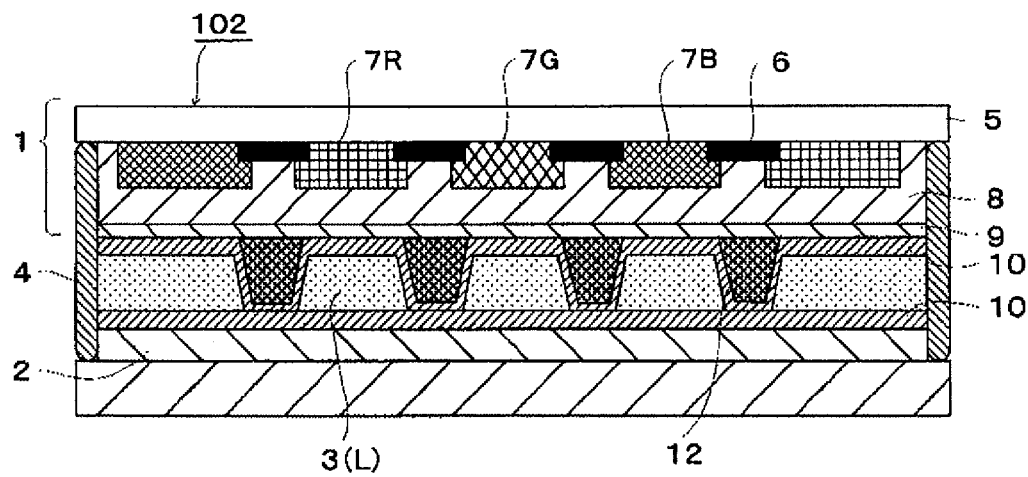
FIG. 1B is a schematic sectional view showing another example of a liquid crystal panel.

1. Color filter
2. Electrode substrate
3. Clearance
4. Seal material
5. Transparent substrate
6. Black matrix layer
7. (7R, 7G, 7B) pixels
8. Protective film 9. Transparent electrode film
10. Orientation film
11. Pearl
12. Columnar spacer
20. Ink-repellent dividing wall
21. Image forming region
22. Ink jet head
23. Ink layer
24. Pixel portion
31. Pixel
32. Outside peripheral part
33. Vicinity of the outer peripheral part
34. Portion having a lower thickness
35. Portion having the highest thickness
36. Black matrix
101, 102. Color liquid crystal display device
103, 104. Color filter

PREFERRED EMBODIMENT OF THE INVENTION

A method of producing a color filter according to the present invention comprises a step (A) of preparing an ink-jet ink for color filter, the ink containing a pigment, a pigment dispersing agent, a binder forming system and a solvent wherein the solvent contains, as its main solvent, a solvent component having a boiling point of 180° C. to 260° C. and a vapor pressure of 0.5 mm Hg or less at ordinary temperature in a ratio of 60% by weight or more based on the total amount of the solvent, the ratio (P/V ratio) of the weight of the pigment and the sum of the weights of the pigment dispersing agent and the binder forming system is 0.5 to 1.0 when an R pixel is formed, 0.5 to 1.2 when a G pixel is formed and 0.3 to 0.5 when a B pixel is formed and the concentration of a solid based on the total weight of the ink is 15% by weight to 25% by weight, a step (B) of forming an R ink layer, a G ink layer and a B ink layer respectively by making the R pixel forming ink, the G pixel forming ink and the B pixel forming ink obtained by the step (A) selectively adhere on each predetermined area of a transparent substrate by the ink-jet method, and a step (C) of curing each of the ink layer to form an R pixel, a G pixel and a B pixel which each have an average film thickness range from 1.5 μm to 2.5 μm and a film thickness distribution range from 1.0 μm to 3.0 μm, wherein the ratio of the total area of the regions having a film thickness of 1.5 μm or less or 2.5 μm or more in one pixel is 5% or less.

The method of producing a color filter in the present invention can produce a color filter which has the same or the almost same color characteristics and brightness as a color filter having flat pixels obtained by the spin coating method in the same condition as to the average film thickness and the structural ratio of materials. Also, since the ink jet method is used, high productivity is attained and a reduction in cost and an improvement in yield can be realized.

1. Step (A) of Preparing an Ink-Jet Ink

A step (A) of preparing an ink-jet ink in the method of producing a color filter according to the present invention will be explained.

The ink-jet ink to be used in the present invention contains a pigment, a pigment dispersing agent, a binder forming system, a solvent and, as needed, a surfactant.

(Pigment)

As the colorant in the ink-jet ink to be used in the present invention, a desired one may be selected from known organic colorants and inorganic colorants and used. As the organic colorants, for example, dyes, organic pigments or natural dyes may be used. As the inorganic colorants, for example, inorganic pigments or extender pigments may be used. Among these materials, the organic pigments have high color developing ability and high heat resistance and are therefore preferably used. Examples of the organic pigments may include compounds classified as the Pigments in the Color Index (C.I.; published from The society of Dyers and Colourists) and, specifically, those represented by the following color indexes (C.I.).

C.I. Pigment Yellow 1, C.I. Pigment Yellow 3, C.I. Pigment Yellow 12, C.I. Pigment Yellow 13, C.I. Pigment Yellow 14, C.I. Pigment Yellow 15, C.I. Pigment Yellow 16, C.I. Pigment Yellow 17, C.I. Pigment Yellow 20, C.I. Pigment Yellow 24, C.I. Pigment Yellow 31, C.I. Pigment Yellow 55, C.I. Pigment Yellow 60, C.I. Pigment Yellow 61, C.I. Pigment Yellow 65, C.I. Pigment Yellow 71, C.I. Pigment Yellow 73, C.I. Pigment Yellow 74, C.I. Pigment Yellow 81, C.I. Pigment Yellow 83, C.I. Pigment Yellow 93, C.I. Pigment Yellow 95, C.I. Pigment Yellow 97, C.I. Pigment Yellow 98, C.I. Pigment Yellow 100, C.I. Pigment Yellow 101, C.I. Pigment Yellow 104, C.I. Pigment Yellow 106, C.I. Pigment Yellow 108, C.I. Pigment Yellow 109, C.I. Pigment Yellow 110, C.I. Pigment Yellow 113, C.I. Pigment Yellow 114, C.I. Pigment Yellow 116, C.I. Pigment Yellow 117, C.I. Pigment Yellow 119, C.I. Pigment Yellow 120, C.I. Pigment Yellow 126, C.I. Pigment Yellow 127, C.I. Pigment Yellow 128, C.I. Pigment Yellow 129, C.I. Pigment Yellow 138, C.I. Pigment Yellow 139, C.I. Pigment Yellow 150, C.I. Pigment Yellow 151, C.I. Pigment Yellow 152, C.I. Pigment Yellow 153, C.I. Pigment Yellow 154, C.I. Pigment Yellow 155, C.I. Pigment Yellow 156, C.I. Pigment Yellow 166, C.I. Pigment Yellow 168, C.I. Pigment Yellow 175;

C.I. Pigment Orange 1, C.I. Pigment Orange 5, C.I. Pigment Orange 13, C.I. Pigment Orange 14, C.I. Pigment Orange 16, C.I. Pigment Orange 17, C.I. Pigment Orange 24, C.I. Pigment Orange 34, C.I. Pigment Orange 36, C.I. Pigment Orange 38, C.I. Pigment Orange 40, C.I. Pigment Orange 43, C.I. Pigment Orange 46, C.I. Pigment Orange 49, C.I. Pigment Orange 51, C.I. Pigment Orange 61, C.I. Pigment Orange 63, C.I. Pigment Orange 64, C.I. Pigment Orange 71, C.I. Pigment Orange 73; C.I. Pigment Violet 1, C.I. Pigment Violet 19, C.I. Pigment Violet 23, C.I. Pigment Violet 29, C.I. Pigment Violet 32, C.I. Pigment Violet 36, C.I. Pigment Violet 38;

C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48:1, C.I. Pigment Red 48:2, C.I. Pigment Red 48:3, C.I. Pigment Red 48:4, C.I. Pigment Red 49:1, C.I. Pigment Red 49:2, C.I. Pigment Red 50:1, C.I. Pigment Red 52:1, C.I. Pigment Red 53:1, C.I. Pigment Red 57, C.I. Pigment Red 57:1, C.I. Pigment Red 57:2, C.I. Pigment Red 58:2, C.I. Pigment Red 58:4, C.I. Pigment Red 60:1, C.I. Pigment Red 63:1, C.I. Pigment Red 63:2, C.I. Pigment Red 64:1, C.I. Pigment Red 81:1, C.I. Pigment Red 83, C.I. Pigment Red 88, C.I. Pigment Red 90:1, C.I. Pigment Red 97, C.I. Pigment Red 101, C.I. Pigment Red 102, C.I. Pigment Red 104, C.I. Pigment Red 105, C.I. Pigment Red 106, C.I. Pigment Red 108, C.I. Pigment Red 112, C.I. Pigment Red 113, C.I. Pigment Red 114, C.I. Pigment Red 122, C.I. Pigment Red 123, C.I. Pigment Red 144, C.I.

Pigment Red 146, C.I. Pigment Red 149, C.I. Pigment Red 150, C.I. Pigment Red 151, C.I. Pigment Red 166, C.I. Pigment Red 168, C.I. Pigment Red 170, C.I. Pigment Red 171, C.I. Pigment Red 172, C.I. Pigment Red 174, C.I. Pigment Red 175, C.I. Pigment Red 176, C.I. Pigment Red 177, C.I. Pigment Red 178, C.I. Pigment Red 179, C.I. Pigment Red 180, C.I. Pigment Red 185, C.I. Pigment Red 187, C.I. Pigment Red 188, C.I. Pigment Red 190, C.I. Pigment Red 193, C.I. Pigment Red 194, C.I. Pigment Red 202, C.I. Pigment Red 206, C.I. Pigment Red 207, C.I. Pigment Red 208, C.I. Pigment Red 209, C.I. Pigment Red 215, C.I. Pigment Red 216, C.I. Pigment Red 220, C.I. Pigment Red 224, C.I. Pigment Red 226, C.I. Pigment Red 242, C.I. Pigment Red 243, C.I. Pigment Red 245, C.I. Pigment Red 254, C.I. Pigment Red 255, C.I. Pigment Red 264, C.I. Pigment Red 265;

C.I. Pigment Blue 15, C.I. Pigment Blue 15:3, C.I. Pigment Blue 15:4, C.I. Pigment Blue 15:6, C.I. Pigment Blue 60; C.I. Pigment Green 7, C.I. Pigment Green 36; C.I. Pigment Brown 23, C.I. Pigment Brown 25; C.I. Pigment Black 1 and Pigment Black 7.

Also, specific examples of the inorganic pigments or extender pigments may include titanium oxide, barium sulfate, calcium carbonate, zinc oxide, lead sulfate, yellow lead, zinc yellow, iron oxide red (Red iron oxide (III)), cadmium red and amber. In the present invention, other pigments may be used either singly or by mixing two or more.

In the ink-jet ink to be used in the present invention, the pigment is formulated in an amount of, usually, 1 to 60% by weight and preferably 15 to 40% by weight based on the total solid of the ink-jet ink.

(Pigment Dispersing Agent)

The pigment dispersing agent is contained in the ink-jet ink to disperse the pigment sufficiently. As the pigment dispersing agent, for example, a cationic type, anionic type, nonionic type, amphoteric or silicone type surfactant may be used. Also, a dispersion auxiliary resin such as a specific acryl type polymer may be further used. In the production method of the present invention, it is preferable to contain a polyethylimine derivative or polyallylamine derivative from the point of easily narrowing the range of the distribution of film thickness of the ink layer obtained by making the ink adhere by the ink-jet method and curing.

Here, the polyethylimine derivative means a dispersant including a polyethyleneimine group which contains plural poly(carbonylalkyleneoxy) chains each having plural repeat units which can be derived from 6-hydroxyhexanoic acid and at least one other hydroxycarboxylic acid selected from ricinolic acid, 12-hydroxystearic acid, 12-hydroxydodecanoic acid, 5-hydroxydodecanoic acid, 5-hydroxydecanoic acid and 4-hydroxydecanoic acid, wherein the ratio by weight of the unit derivable from 6-hydroxyhexanoic acid to the unit derivable from the other hydroxycarboxylic acid (single or plural) is in a range from 90:10 to 10:90, or a dispersant including a salt of acid thereof.

The ratio by weight of the unit derivable from 6-hydroxyhexanoic acid to the unit derivable from the other hydroxycarboxylic acid (single or plural) is in a range from preferably 20:80 to 80:20 and more preferably 20:80 to 50:50.

The polyethyleneimine (hereinafter referred to as "PEI" in this specification) group may be either a branched or straight-chain type and typically has a weight average molecular weight of at least 500, preferably at least 1,000 and more preferably at least 10,000. The average molecular weight of the polyethyleneimine is preferably less than 600,000, more preferably less than 200,000 and even more preferably less than 50,000.

The poly(carbonylalkyleneoxy) chain (hereinafter referred to as "PCAO chain" in this specification) is a polyester chain derivable by the polymerization of the hydroxycarboxylic acid (or corresponding lactones if it is appropriate), wherein the chain is a copolyester chain containing plural carbonylalkyleneoxy (hereinafter referred to as "CAO" in this specification) units derivable from 6-hydroxyhexanoic acid and at least one of the other hydroxycarboxilic acids in block or random arrangement. The PCAO chain typically contains 2 to 10, preferably 3 to 40 and more preferably 4 to 15 CAO groups in average and may have a chain-stopping terminal group at an oxy terminal such as an alkyl carbonyl group and preferably, an alkyl carbonyl group having 12 or more carbon atoms which may be substituted.

The PCAO chain may be bonded to the PEI group by an ionic salt linkage and/or a covalent amide formed between the PEI group and the hydroxycarboxylic acid of the PCAO chain. This acid is referred to as "PCAO acid" in this specification. Such an amide bond may be formed by the reaction between the terminal carboxylate group of the PCAO acid and a primary or secondary amino group in PEI, whereas the salt bond is formed between the terminal carboxylate group of the PCAO acid and a positively charged nitrogen atom of a substituted ammonium group in PEI.

The ratio by weight of the PCAO chain to the PEI group is in a range, typically, from 2:1 to 30:1, preferably from 3:1 to 20:1, more preferably from 8:1 to 20:1 and even more preferably from 10:1 to 15:1.

The polyethylimine derivative may have a form with a structure in which a nitrogen atom in the PEI group which nitrogen atom is not bonded to the PCAO chain exists as a free amino group, a salt form with a structure in which the nitrogen atom exist as a substituted ammonium group in which the nitrogen atom is associated with a counter ion derivable from an organic and/or inorganic acid, or an intermediate form with a structure in which a free amino group and a substituted ammonium group are contained.

The polyethylimine derivative may be prepared by reacting PEI with a PCAO acid (single or plural) or its precursor.

The polyallylamine derivative is derivatives of polyallylamine which are obtained by modifying an amino group at the side chain of the polyallylamine with any of a polyester, polyamide and a co-condensate of a polyester and a polyamide F (polyester amide) and have a wide range of solubility in a resin in which the pigment is to be dispersed and also have excellent pigment-dispersing ability, these derivatives being represented by the following formula (I).

[Formula 1]

In the formula, X and Y respectively represent hydrogen, a polymerization initiator residue or a chain transfer catalyst residue, $R^1$ represents a free amino group or a group represented by the following formula (II) or (III), and "n" denotes an integer from 2 to 1,000, provided that at least one of "n" $R^1$s represents a group represented by the formula (III).

[Formula 2]

$$NH_3{}^+\text{—}OCOR^2 \qquad (II)$$

$$NHCOR^2 \qquad (III)$$

In the formula, $R^2$ represents a residue obtained by excluding a carboxyl group from a polyester having a free carboxylic acid, a polyamide having a free carboxylic acid and a polyester amide having a free carboxylic acid.

The polyallylamine derivative of the present invention is obtained by reacting a polyallylamine with one or more compounds selected from a polyester, polyamide and a co-condensate of a polyester and a polyamide (polyester amide) which each have a free carboxyl group.

The polyallylamine derivative may be produced using a polyallylamine having a degree of polymerization of 2 to 1,000, and one or two or more of a polyester represented by the following formula (IV) or (V) and one or two or more polyamides represented by the following formula (VI) or (VII) which each have a free carboxyl group as raw materials.

[Formula 3]

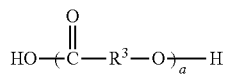
(IV)

In the formula, $R^3$ represents a straight-chain or branched alkylene group having 2 to 20 carbon atoms and "a" denotes an integer from 2 to 100.

[Formula 4]

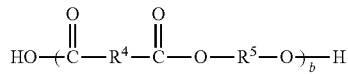
(V)

In the formula, $R^4$ represents a straight-chain or branched alkylene group having 2 to 20 carbon atoms, $C_6H_4$ or CH=CH, $R^5$ represents a straight-chain or branched alkylene group having 2 to 20 carbon atoms or a residual group obtained by excluding two hydroxyl groups from a polyalkylene glycol and "b" denotes an integer from 2 to 100. Also, an ether bond may be contained in the chain.

[Formula 5]

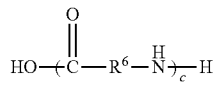
(VI)

In the formula, $R^6$ represents a straight-chain or branched alkylene group having 2 to 20 carbon atoms and "c" denotes an integer from 2 to 100.

[Formula 6]

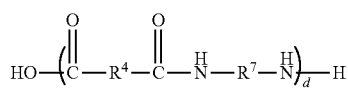
(VII)

In the formula, $R^4$ represents a straight-chain or branched alkylene group having 2 to 20 carbon atoms, $C_6H_4$ or CH=CH, $R^7$ represents a straight-chain or branched alkylene group having 2 to 20 carbon atoms and "d" denotes an integer from 2 to 100.

The polyallylamine derivative preferably used as the pigment dispersing agent in the present invention may be produced also by reacting a polyallylamine with a polyester obtained by polymerizing the repeat units in the formulae (IV) and (V) at random, a polyamide obtained by polymerizing the repeat units in the formulae (VI) and (VII) at random, or polyester amide obtained by polymerizing the repeat units in the formulae (IV) and/or (V) and repeat units in the formulae (VI) and/or (VII) at random.

As the pigment dispersing agent, commercially available products such as Ajisper Pb821 (manufactured by Ajinomoto Fine-Techno Co., Inc.) as the polyallylamine derivative and Solsperse 33000 (manufactured by Avecia Company) as the polyethyleneimine derivative may be used.

Besides the above polyethylimine derivatives and polyallylamine derivatives, high-molecular surfactants may be used, which include polyoxyethylene alkyl ethers such as a polyoxyethylene lauryl ether, polyoxyethylene stearyl ether and polyoxyethylene oleyl ether; polyoxyethylene alkylphenyl ethers such as a polyoxyethylene octylphenyl ether and polyoxyethylene nonylphenyl ether; polyethylene glycol diesters such as a polyethylene glycol dilaurate and polyethylene glycol distearate; sorbitan fatty acid esters; fatty acid modified polyesters; and tertiary amine modified polyurethanes may be used.

The content of the pigment dispersing agent is 5 to 50% by weight and preferably 10 to 30% by weight based on the total solid.

The glass transition temperature (Tg) of the pigment dispersing agent is 200° C. or less and preferably 150° C. or less from the viewpoint of more preventing the sinking at the edge of BM in the sectional shape of a pixel of a color filter. The glass transition temperature here is measured by a differential scanning calorimeter (DSC). For example, the glass transition temperature may be measured using a thermochemical reaction calorimeter (manufactured by Seiko Instruments Inc.) in the condition of a temperature range from 25 to 280° C. and a temperature rise rate of 7.5° C./min.

(Binder Forming System)

The ink-jet ink to be used in the present invention contains a binder forming system to impart film-forming ability and adhesion to the surface to be coated. In the present invention, the binder forming system is a liquid mixture which is contained to attach and fix pixels to predetermined positions and includes a curable compound having reactivity in the subsequent curing process and a compound itself having no reactivity.

The ink used in the present invention is one used in the ink jet system. In the formation of a predetermined pattern, this pattern can be formed by making the ink selectively adhere only predetermined pattern forming region and solidify, and it is unnecessary to form a pattern by carrying out exposure and developing. Therefore, a photocurable binder forming system permitting exposure and developing is unnecessarily used. Therefore, though a non-curable thermoplastic resin composition may be used, it is preferable to use a binder forming system containing a curable resin with the intention of imparting satisfactory hardness to the cured film.

As the curable binder forming system, a heatcurable Binder forming system containing a heatcurable resin which can be polymerized and cured by heating, a photocurable binder forming system containing a photocurable resin which can be polymerized and cured by visible rays, ultraviolet rays, electron rays or the like, and also, a type containing both the heatcurable binder and the photocurable binder may be used. In the ink-jet ink according to the present invention, the binder forming system is preferably a heatcurable binder forming system from the point of more improving the film properties of pixels, such as solvent resistance, adhesion and resistance to ITO. Here, resistance to ITO is resistance to defects when an ITO circuit is formed or when an orientation film is formed. Specifically, heat resistance at 230° C. to 250°

C. after an ITO circuit is formed is given as examples. Also, when a heatcurable binder is used, this brings about such a merit that specific auxiliary facilities including a photo-radiation apparatus are unnecessary and high productivity is obtained.

(1) Heatcurable Binder Forming System

As the heatcurable binder forming system, a combination of a compound containing two or more heatcurable functional groups in its molecule and a curing agent is usually used. Also, a catalyst capable of promoting a heat-curing reaction may be added to the heatcurable forming type. An epoxy group is preferably used as the heatcurable functional group. Also, a polymer itself having no polymerization reactivity may be further formulated in these components.

As the compound having two or more heatcurable functional groups in its molecule, an epoxy compound having two or more epoxy groups in its molecule is preferably used from the point of the ejection sustainability of the ink jet and the properties such as solvent resistance, adhesion and resistance to ITO of the film of pixels formed from the ink-jet ink. The epoxy compound having two or more epoxy groups in its molecule is an epoxy compound (including those called epoxy resins) having two or more epoxy groups, preferably 2 to 50 epoxy groups and more preferably 2 to 20 epoxy groups in its molecule. As the epoxy group, any epoxy group may be used insofar as it has an oxirane ring structure. Examples of the epoxy group include a glycidyl group, oxyethylene group and epoxycyclohexyl group. Examples of the epoxy compound may include known polyvalent epoxy compounds which can be cured by a carboxylic acid. Such an epoxy compound is widely disclosed in, for example, "Epoxy Resin Handbook" edited by Masaki Shinpo, published from The Nikkan Kogyo Shinbun, Ltd. (1987), and these disclosed compounds may be used in the present invention.

As the epoxy compound, it is preferable to use a combination of a polymer having a relatively high molecular weight which polymer imparts solvent resistance and heat resistance to the cured film and a compound having a relatively lower molecular weight which compound is to improve the ink-jet ejecting performance by reducing the viscosity of the ink.

i) Compound Having Two or More Heatcurable Functional Groups in its Molecule

As the epoxy compound (hereinafter referred to as "binder type epoxy compound" as the case may be) which is a polymer having a relatively high molecular weight and usually used in the binder forming system component, a polymer which is constituted of at least a constitutional unit represented by the following formula (1) and a constitutional unit represented by the following formula (2) and has two or more glycidyl groups may be used.

[Formula 7]

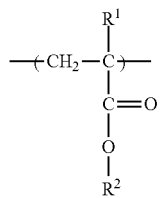

(1)

In the formula (1), $R^1$ represents a hydrogen atom or an alkyl group having 1 to 3 carbon atoms and $R^2$ represents a hydrocarbon group having 1 to 12 carbon atoms.

[Formula 8]

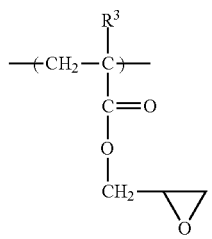

(2)

In the formula (2), $R^3$ represents a hydrogen atom or an alkyl group having 1 to 10 carbon atoms.

The constitutional unit represented by the formula (1) is derived from a monomer represented by the following formula (3).

[Formula 9]

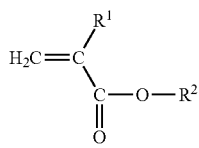

(3)

In the formula (3), $R^1$ and $R^2$ are the same as those in the formula (1).

Sufficient hardness and transparency can be imparted to the cured coating film formed from the ink-jet ink according to the present invention by using the monomer represented by the formula (3) as the constitutional unit of the binder type epoxy compound. In the formula (3), $R^2$ which is a hydrocarbon group having 1 to 12 carbon atoms may be any of straight-chain aliphatic, alicyclic or aromatic hydrocarbon groups and may have additional structures such as a double bond, side chain of a hydrocarbon group, side chain of a spiro ring and endocyclic crosslinked hydrocarbon group.

Specific examples of the monomer represented by the formula (3) may include methyl(meth)acrylate, ethyl(meth)acrylate, i-propyl(meth)acrylate, n-propyl(meth)acrylate, i-butyl(meth)acrylate, n-butyl(meth)acrylate, t-butyl(meth)acrylate, 2-ethylhexyl(meth)acrylate, hexyl(meth)acrylate, octyl(meth)acrylate, lauryl(meth)acrylate, cyclohexyl(meth)acrylate, para-t-butylcyclohexyl(meth)acrylate, isobornyl(meth)acrylate, benzyl(meth)acrylate, dicyclopentenyl(meth)acrylate and phenyl(meth)acrylate.

In the formula (3), $R^1$ is preferably hydrogen or a methyl group, and $R^2$ is preferably an alkyl group having 1 to 12 carbon atoms and more preferably a methyl group and cyclohexyl group among these groups. Preferable examples of the monomer represented by the formula (3) may include methylmethacrylate (MMA) and cyclohexylmethacrylate (CHMA).

The constitutional unit represented by the formula (2) in the polymer is derived from a monomer represented by the following formula (4).

[Formula 10]

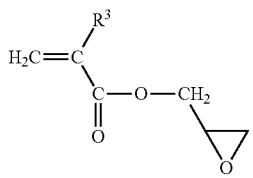

(4)

In the formula (4), $R^3$ is the same that in the formula (2).

The monomer represented by the formula (4) is used to introduce an epoxy group (reaction point of epoxy) into the polymer. The ink-jet ink containing such a polymer is superior in storage stability, so that it is resistant to a rise in viscosity during storage and in a jetting operation. As one of the reasons, it is inferred that the epoxy group in the formula (2) or formula (4) is a glycidyl group. When an alicyclic epoxyacrylate is used in place of the monomer represented by the formula (4), the viscosity of the ink-jet ink tends to increase.

In the formula (4), hydrogen or a methyl group is preferable as $R^3$. Specific examples of the monomer represented by the formula (4) may include glycidylmethacrylate: particularly, glycidylmethacrylate (GMA) is preferable.

The polymer may be either a random copolymer or block copolymer. Also, the polymer may contain a principal chain constitutional unit other than the constitutional unit represented by the formula (1) or (2). Specific examples of such a monomer may include acrylonitrile and styrene.

The content of the constitutional unit of the formula (1) and constitutional unit of the formula (2) in the binder type epoxy compound is preferably in a range from 10:90 to 90:10 when expressed as the input ratio by weight of the monomer from which the constitutional unit of the formula (1) is derived to the monomer from which the constitutional unit of the formula (2) is derived (Monomer from which the formula (1) is derived: Monomer from which the formula (2) is derived).

When the amount of the constitutional unit of the formula (1) is larger than the ratio (10:90), there is a fear that the curing reaction point is reduced, thus bringing about a reduction in crosslinking density. On the other hand, when the amount of the constitutional unit of the formula (2) is larger than the ratio (90:10), there is a fear that bulky skeletons are reduced, thus bringing about larger curing shrinkage.

The weight average molecular weight of the binder type epoxy compound is preferably 3,000 or more and more preferably 4,000 or more in terms of the polystyrene calibrated-weight average molecular weight. This is because when the molecular weight of the binder type epoxy compound is smaller than 3,000, the properties such as strength and solvent resistance required for the cured layer as the fine part of the color filter tend to be unsatisfied. On the other hand, the weight average molecular weight of the binder type epoxy compound is preferably 20,000 or less and more preferably 15,000 or less in terms of the polystyrene calibrated-weight average molecular weight. This is because when this molecular weight is larger than 20,000, the viscosity tends to be increased and there is therefore a fear that the stability of the amount of ink to be jetted and the straight-forwarding characteristics of the jetting direction when the ink is jetted from the ejection head by the ink jet system are deteriorated and there is also a fear that the long-term storage stability is deteriorated.

As the binder type epoxy compound, it is particularly preferable to use a GMA/MMA type copolymer which has a weight average molecular weight (Mw) falling in the range above polystyrene calibrated-weight average molecular weight and is polymerized using at least glycidyl methacrylate (GMA) and methylmethacrylate (MMA). In this case, the GMA/MMA type copolymer may be one polymerized using other monomer components insofar as the object of the present invention can be attained.

To explain a synthetic example of the binder type epoxy compound, a four-neck flask equipped with a temperature gage, a reflux condenser, a stirrer and a dropping funnel is charged with a solvent containing no hydroxyl group and the solvent is heated to 120° C. with stirring. The reason why the solvent containing no hydroxyl group is used is that it is intended to avoid the decomposition of an epoxy group during the synthetic reaction. Then, a mixture (dripping component) of a composition constituted of a combination of the monomer represented by the formula (3), the monomer represented by the formula (4) and as necessary, other monomers and a polymerization initiator is added dropwise at constant speed from the dropping funnel over two hours. After the addition is finished, the mixture is cooled and a catalyst is added to the mixture to react for 3 hours. The reaction mixture is heated to 130° C. at which the mixture is kept for 2 hours and then the reaction is stopped to thereby obtain the binder type epoxy compound.

In the heatcurable type binder forming system to be used in the present invention, an epoxy compound (hereinafter referred to as "polyfunctional epoxy compound" according to the need) which has two or more epoxy groups in one molecule and also has a lower molecular weight than the binder type epoxy resin. Particularly, it is preferable to use a combination of the binder type epoxy compound and the polyfunctional epoxy compound. In this case, the weight average molecular weight of the polyfunctional epoxy compound based on polystyrene is preferably 4,000 or less and more preferably 3,000 or less on condition that it is lower than that of the binder type epoxy compound to be combined with the epoxy compound.

Since the epoxy group (glycidyl group) is introduced by the constitutional unit represented by the formula (2) into the binder type epoxy compound, the amount of the epoxy that can be introduced into a molecular of the copolymer is limited. When a polyfunctional epoxy compound having a relatively small molecular weight is added in the ink-jet ink, epoxy groups in the ink-jet ink are supplemented, thus leading to an increase in the concentration of reaction points of epoxy, making possible to increase crosslinking density.

Among polyfunctional epoxy compounds, an epoxy compound having four or more epoxy groups in one molecule is preferably used to raise the crosslinking density of an acid-epoxy reaction. Particularly, when the weight average molecular weight of the binder type epoxy compound is made to be 10,000 or less to improve the ejecting performance of the ink from the ejection head in the ink jet system, the strength and hardness of the cured layer tend to decrease. It is therefore preferable to combine such a polyfunctional epoxy compound having four or more functions in the ink-jet ink to raise the crosslinking density of the film.

As the polyfunctional epoxy compound, any polyfunctional epoxy compound may be used without any particular limitation insofar as it has two or more epoxy groups in one molecule. For example, a bisphenol A-type epoxy resin, bisphenol F-type epoxy resin, brominated bisphenol A-type epoxy resin, bisphenol S-type epoxy resin, diphenyl ether type epoxy resin, hydroquinone type epoxy resin, naphthalene type epoxy resin, biphenyl type epoxy resin, fluorene type epoxy resin, phenol novolac type epoxy resin, orthocresol novolac type epoxy resin, trishydroxyphenylmethane type epoxy resin, trifunctional type epoxy resin, tetraphenylolethane type epoxy resin, dicyclopentadienephenol type epoxy resin, hydrogenated bisphenol A type epoxy resin, polyol-containing bisphenol A type epoxy resin, polypropylene glycol type epoxy resin, glycidyl ester type epoxy resin, glycidylamine type epoxy resin, glyoxal type epoxy resin, alicyclic epoxy resin, heterocyclic type epoxy resin and the like may be used.

Specific examples of the polyfunctional epoxy compound may include a bisphenol A-type epoxy resin such as Epikote 828 (trade name, manufactured by Japan Epoxy Resins Co., Ltd.), bisphenol F-type epoxy resin such as YDF-175S (trade name, manufactured by Tohto Kasei Co., Ltd.), brominated bisphenol A-type epoxy resin such as YDB-715 (trade name, manufactured by Tohto Kasei Co., Ltd.), bisphenol S-type epoxy resin such as EPICLON EXA1514 (Dainippon Ink and Chemicals, Incorporated), hydroquinone type epoxy resin such as YDC-1312 (trade name, manufactured by Tohto Kasei Co., Ltd.), naphthalene type epoxy resin such as EPICLON EXA4032 (trade name, manufactured by Dainippon Ink and Chemicals, Incorporated), biphenyl type epoxy resin such as Epikote YX4000H (trade name, manufactured by Japan Epoxy Resins Co., Ltd.), bisphenol A-type novolac type resin such as Epikote 157S70 (trade name, manufactured by Japan Epoxy Resins Co., Ltd., phenol novolac type epoxy resin such as Epikote 154 (trade name, manufactured by Japan Epoxy Resins Co., Ltd.) and YDPN-638 (tradename, manufactured by Tohto Kasei Co., Ltd.), cresol novolac type epoxy resin such as YDCN-701 (trade name, manufactured by Tohto Kasei Co., Ltd.), dicyclopentadienephenol type epoxy resin such as EPICLON HP-7200 (trade name, manufactured by Dainippon Ink and Chemicals, Incorporated), trishydroxyphenylmethane type epoxy resin such as Epikote 1032H60 (trade name, manufactured by Japan Epoxy Resins Co., Ltd.), trifunctional type epoxy resin such as VG3101M80 (trade name, manufactured by Mitsui Chemicals, Inc.), tetraphenylolethane type epoxy resin such as Epikote 1031S (trade name, manufactured by Japan Epoxy Resins Co., Ltd.), tetrafunctional type epoxy resin such as Denacol EX-411 (trade name, manufactured by Nagase Kasei Kogyo), hydrogenated bisphenol A type epoxy resin such as ST-3000 (trade name, manufactured by Tohto Kasei Co., Ltd.), glycidyl ester type epoxy resin such as Epikote 190P (trade name, manufactured by Japan Epoxy Resins Co., Ltd.), glycidyl amine type epoxy resin such as YH-434 (trade name, manufactured by Tohto Kasei Co., Ltd.), glyoxal type epoxy resin such as YDG-414 (trade name, Tohto Kasei Co., Ltd.), alicyclic epoxy resin such as GT-401 (trade name, manufactured by Daicel Chemical Industries, Ltd.) and heterocyclic type epoxy resin such as triglycidylisocyanate (TGIG). Also, Neotohto E (trade name, manufactured by Tohto Kasei Co., Ltd.) and the like may be combined as an epoxy reactive diluent.

Among these polyfunctional epoxy compounds, a bisphenol A type novolac type epoxy resin such as Epikote 157S70 (trade name, Japan Epoxy Resins Co., Ltd.) and cresol novolac type epoxy resin such as YDCN-701 (trade name, manufactured by Tohto Kasei Co., Ltd.) are more preferable.

<Combination Ratio of the Epoxy Compounds>

As to the ratios by weight of the binder type epoxy compound above to be combined and the polyfunctional epoxy compound to be combined as necessary, the binder type epoxy compound and the polyfunctional epoxy compound are combined in amounts of preferably 10 to 80 parts by weight and 10 to 60 parts by weight respectively, more preferably 20 to 60 parts by weight and 20 to 50 parts by weight respectively, and even more preferably 30 to 40 parts by weight and 25 to 35 parts by weight respectively.

ii) Curing Agent

In the heatcurable binder forming system to be used in the present invention, a curing agent is usually compounded in combination. As the curing agent, for example, a polyvalent carboxylic acid anhydride or polyvalent carboxylic acid is used.

Specific examples of the polyvalent carboxylic acid anhydride may include aliphatic or alicyclic dicarboxylic acid anhydrides such as phthalic acid anhydride, itaconic acid anhydride, succinic acid anhydride, citraconic acid anhydride, dodecenylsuccinic acid anhydride, tricarballyic acid anhydride, maleic acid anhydride, hexahydrophtalic acid anhydride, dimethyltetrahydrophthalic acid anhydride, himic acid anhydride and nagic acid anhydride; aliphatic polyvalent carboxylic acid dianhydrides such as 1,2,3,4-butanetetracarboxylic acid dianhydride and cyclopentane tetracarboxylic acid dianhydride; aromatic polyvalent carboxylic acid anhydrides such as pyromellitic acid anhydride, trimellitic acid anhydride and benzophenone tetracarboxylic acid anhydride; and ester group-containing acid anhydride such as ethylene glycol bistrimellitate and glycerin tristrimellitate. More preferable examples of the polyvalent carboxylic acid anhydride include aromatic polyvalent carboxylic acid anhydride. Also, a commercially available epoxy resin curing agent including a carboxylic anhydride is preferably used.

Also, specific examples of the polyvalent carboxylic acid to be used in the present invention include aliphatic polyvalent carboxylic acids such as succinic acid, glutaric acid, adipic acid, butanetetracarboxylic acid, maleic acid and itaconic acid; aliphatic polyvalent carboxylic acids such as hexahydrophthalic acid, 1,2-cyclohexanedicarboxylic acid, 1,2,4-cyclohexanetricarboxylic acid and cyclopentanetetracarboxylic acid and aromatic polyvalent carboxylic acids such as phthalic acid, isophthalic acid, terephthalic acid, pyromellitic acid, trimellitic acid, 1,4,5,8-naphthalenetetracarboxylic acid and benzophenonetetracarboxylic acid, the aromatic polyvalent carboxylic acids being preferable.

These curing agents may be used either singly or in combinations of two or more. The amount of the curing agent to be compounded in the present invention is in a range usually from 1 to 100 parts by weight and preferably 5 to 50 parts by weight based on 100 parts by weight of the components (the binder type epoxy compound and the polyfunctional epoxy compound). When the amount of the curing agent to be compounded is less than 1 part by weight, there is a fear that only insufficient curing is attained and no tough coating film can be formed. When the amount of the curing agent to be compounded exceeds 100 parts by weight, there is a fear as to deteriorated adhesiveness of the coating film to the substrate.

iii) Catalyst

In the heatcurable binder forming system to be used in the present invention, a catalyst which can promote a thermally curing reaction between the acid and the epoxy group may be added to improve the hardness and heat resistance of the cured layer. As such a catalyst, a thermal potential catalyst exhibiting activity when heated may be used.

The thermal potential catalyst serves to develop catalyst activity, to promote a curing reaction and to provide better properties to the cured product when heated, and is added as necessary. This thermal potential catalyst is preferably those exhibiting acid catalyst activity at 60° C. or more and examples of these catalysts include compounds obtained by neutralizing a protonic acid by a Lewis base, compounds obtained by neutralizing a Lewis acid by a Lewis base, mixtures of a Lewis acid and a trialkyl phosphate, sulfonates and onium compounds. Various compounds as disclosed in the publication of Japanese Patent Application Laid-Open No. 4-218561 may be used. Specific examples of these compounds may include (i) compounds obtained by neutralizing halogeno carboxylic acids, sulfonic acids, monophosphates and diphosphates and the like by various amines such as ammonia, monomethylamine, triethylamine, pyridine or ethanolamines or trialkylphosphine, (ii) compounds obtained by neutralizing a Lewis acid such as $BF_3$, $FeCl_3$, $SnCl_4$, $AlCl_3$ or $ZnCl_2$ by a Lewis base mentioned above, (iii) ester compounds between methanesulfonic acid, ethanesulfonic acid or benzenesulfonic acid and a primary alcohol or secondary alcohol (iv) monophosphates or diphosphates of primary alcohols or secondary alcohols. Examples of the onium compound may include ammonium compounds $[R_3NR']^+X^-$, sulfonium compounds $[R_3SR']^+X^-$ and oxonium compounds $[R_3OR']^+X^-$. Here, R and R' respectively represents an alkyl, an alkenyl, an aryl or an alkoxy.

The thermal potential catalyst is usually contained in an amount of about 0.01 to 10.0 parts by weight based on 100 parts by weight of the sum of the compound having two or more heatcurable functional groups in one molecule and the curing agent.

(2) Photocurable Binder Forming System i) Polymer

In the binder forming system containing a photocurable resin which can be polymerized and cured by light such as ultraviolet rays or electron rays, it preferably contains a polymer having a relatively high molecular weight from the point of view of imparting film-forming ability and adhesion to the surface to be coated. Here, "relatively high molecular weight" means that the molecular weight is higher than that of the so-called monomer or oligomer and a weight average molecular weight of 5,000 or more may be set as the aim of the molecular weight. As the polymer having a relatively high molecular weight, any of a polymer itself having no polymerization reactivity and a polymer itself having polymerization reactivity may be used, or a combination of two or more types may be used. Then, using a polymer having a relatively high molecular weight as a major component, a polyfunctional monomer or oligomer, a monofunctional monomer or oligomer, a photoinitiator activated by light and a sensitizing agent are combined as necessary to constitute a photocurable binder forming system.

When a polymer itself having no polymerization reactivity is used as the polymer having a relatively high molecular weight, a polyfunctional polymerizable component such as polyfunctional monomers or oligomers having two or more functions is combined. In this case, in the binder forming system, the polyfunctional polymerizable component is itself spontaneously polymerized by irradiation with light or polymerized by the action of other components such as the photoinitiator activated by irradiation with light, to form a network structure in the coating film and components such as resins and pigments have no polymerization reactivity are embraced in the network structure and cured.

As such a polymer having no polymerization reactivity, for example, copolymers consisting of two or more of the following monomers may be used: (meth)acrylic acids (hereinafter represents a generic name of both acrylic acids and methacrylic acids), methyl(meth)acrylate, 2-hydroxyethyl (meth)acrylate, benzyl(meth)acrylate, styrene, polystyrene macromonomer and polymethylmethacrylate macromonomer.

More specific examples of this polymer may include a methacrylic acid/benzylmethacrylate copolymer, methacrylic acid/benzylmethacrylate/styrene copolymer, benzylmethacrylate/styrene copolymer, benzylmethacrylate macromonomer/styrene copolymer and benzylmethacrylate/styrene macromonomer copolymer.

As the polymer itself having polymerization reactivity, an oligomer obtained by introducing a polymerizable functional group into a molecule of a polymer having no polymerization reactivity or a polymer which has a higher molecular weight than an oligomer and itself undergoes a polymerization reaction when irradiated with light or initiates a polymerization reaction by the action of other components such as the photoinitiator activated by irradiation with light may be used.

Various ethylenic double bond-containing compounds themselves have polymerization reactivity and may be utilized as photocurable resins. The prepolymers currently compounded in the UV ink-jet ink used in various fields such as inks, paints and adhesives may be used as the polymer having a relatively high molecular weight in the present invention. Examples of the previously known prepolymer include radical polymerization type prepolymers, cation polymerization type prepolymers and thiol-ene addition type prepolymers.

Among these prepolymers, examples of the radical polymerization type prepolymers may include ester acrylates, ether acrylates, urethane acrylates, epoxyacrylates, amino resin acrylates, acryl resin acrylates and unsaturated polyesters, which are easily available in the market.

Among these compounds, preferable examples of polymers having a relatively high molecular weight include the following graft polymers.

Graft polymers preferably used in the present invention are those which have a weight average molecular weight of 5,000 or more and in which one of the principal chain and the graft part is constituted of a styrene type polymer chain containing a styrene type monomer unit and the other is constituted of a methacrylate type polymer chain containing a methacrylate type monomer unit.

The graft polymer may have either a structure in which the principal chain (trunk part) is constituted of a styrene type polymer chain and the graft part is constituted of a methacrylate type polymer chain or a structure in which, on the contrary, the principal chain is constituted of a methacrylate type polymer chain and the graft part is constituted of a styrene type polymer chain. The graft polymer preferably has, among the structures above, the structure in which the principal chain is constituted of a styrene type polymer chain and the graft part is constituted of a methacrylate type polymer chain.

The styrene type polymer chain is a polymer chain containing a styrene type monomer as its major component and may be a homopolymer of only one styrene type monomer, a copolymer of two or more styrene type monomers or a copolymer of a styrene type monomer and other monomers.

The styrene type monomer includes styrene monomers having a substituent such as an alkyl substituted styrene (for example, methyl styrene, ethyl styrene, trimethyl styrene and octyl styrene), methoxystyrene and α-methylstyrene besides styrene.

Examples of the monomer which can be copolymerized with the styrene type monomer include various (meth)acrylate monomers, acrylonitriles and amide type monomers.

In the ink-jet ink to be used in the present invention, the styrene type polymer chain contains a styrene type monomer unit in a ratio of, preferably, 50% by weight and more preferably 60% by weight or more from the viewpoint of the dispersibility of a pigment.

The methacrylate type polymer chain is a polymer chain containing methacrylate as its major component and may be a homopolymer of only one methacrylate type monomer, a copolymer of two or more methacrylate type monomers or a copolymer of a methacrylate type monomer and other monomers.

Examples of the methacrylate type monomer include alkyl methacrylates (for example, methylmethacrylate, ethylmethacrylate, n-butylmethacrylate, iso-butylmethacrylate, tert-butylmethacrylate, hexylmethacrylate, octylmethacrylate and laurylmethacrylate), benzylmethacrylate, phenoxyethylmethacrylate, tetrahydrophthalimide ethylmethacrylate, cyclohexylmethacrylate, isobornylmethacrylate, tetrahydrofurfurylmethacrylate, methoxypolyethylene glycol methacrylate and butoxyethylmethacrylate. It is preferable to select a methacrylate type monomer upon use such that a graft polymer having a Tg of 30° C. or more is obtained. A graft polymer having a Tg less than 30° C. is undesirable because the hardness of the cured coating film is decreased.

Also, as the monomer to be copolymerized with the methacrylate, an alkylacrylate, hydroxyalkylacrylate, amide monomer, imide group-containing monomer, alkylene glycol (meth)acrylate and Placcel FM series (trade name, manufactured by Daicel Chemical Industries, Ltd.) may be used.

The methacrylate type polymer has a relatively high Tg and gives rise to micro-phase separation between itself and styrene. The methacrylate type polymer is therefore superior in hardness and dispersibility. From this point, the methacrylate type polymer chain contains a methacrylate type monomer unit in a ratio of preferably 50% by weight or more and more preferably 70% by weight or more.

The graft polymer may have an ethylenic unsaturated bond and a photopolymerizable functional group such as an epoxy group. Photocurability can be imparted to the graft polymer by introducing a photopolymerizable functional group into the graft polymer. The graft polymer into which the photopolymerizable functional group is introduced may be preferably used as the photocurable resin having a relatively high molecular weight in the present invention because it improves crosslinking points, thus leading to an improvement in surface hardness. When the polymerizable functional group of the graft polymer is an ethylenic unsaturated bond, the graft polymer can be cured by a photo-radical polymerization reaction, whereas when the polymerizable functional group is an epoxy group, photo-cationic polymerization is possible. Particularly, the graft polymer having an ethylenic unsaturated bond may be used in combination with an ethylenic unsaturated bond-containing monomer and/or oligomer such as a (meth)acryl type monomer, whereby ink-jet ink superior in curing reactivity can be obtained. The photopolymerizable functional group may be introduced into one or both of the styrene type polymer chain or methacrylate type polymer chain or may be introduced into one or both of the principal chain or graft part.

Among the compounds above, preferable examples of the graft polymer include a graft polymer in which an ethylenic unsaturated bond is contained in a ratio of 1200 g/eq or less as ethylenic unsaturated bond equivalent, one of the principal chain and graft part is constituted of a styrene type polymer chain containing a styrene type monomer unit and the other is constituted of a benzylmethacrylate type polymer chain containing a monomer unit derived from benzylmethacrylate. This is because among methacrylate monomers, benzylmethacrylate is particularly superior in the dispersibility of a pigment and is therefore preferably used in ink-jet ink for color filter used to form pixels and the like.

The graft polymer may have either a structure in which the principal chain (trunk part) is constituted of a styrene type polymer chain and the graft part is constituted of a benzylmethacrylate type polymer chain or a structure in which, on the contrary, the principal chain is constituted of a benzylmethacrylate type polymer chain and the graft part is constituted of a styrene type polymer chain. Among the structures, the structure in which the principal chain is constituted of a styrene polymer chain and the graft part is constituted of a benzylmethacrylate type polymer chain is rather desirable.

The benzylmethacrylate type polymer chain is a polymer chain containing a benzylmethacrylate as its major component and may be a homopolymer of benzylmethacrylate or a copolymer of benzylmethacrylate and other monomers as mentioned above.

The benzylmethacrylate type polymer chain contains a benzylmethacrylate monomer unit in a ratio of preferably 30% by weight or more and more preferably 50% by weight or more.

The graft polymer has an ethylenic unsaturated bond on at least one of the primary chain and graft part and can be therefore cured by a photo- or heat radical polymerization reaction. It is necessary that the ethylenic unsaturated bond equivalent of the graft polymer be 1200 g/eq or less and preferably 700 g/eq or less. Here, the term "ethylenic unsaturated bond equivalent" means a value obtained by dividing the weight average molecular weight of the graft polymer by the number of ethylenic unsaturated bonds contained in one molecule. The range is defined as above because when the ethylenic unsaturated bond equivalent of the graft polymer exceeds 1200 g/eq, this is undesirable because the hardness and solvent resistance of the cured coating film are unsatisfactory. It is also because a graft polymer having an ethylenic unsaturated bond equivalent of 1200 g/eq or less is superior in various characteristics such as solvent resistance, hardness, strength and adhesiveness because it contains many ethylenic unsaturated bonds in one molecule. Then, even if a graft polymer having a relatively small molecular weight is used to improve ejecting performance, it can be sufficiently cured when the ethylenic unsaturated bond equivalent is 1200 g/eq or less and therefore, ink superior in ejecting performance is obtained and a cured coating film superior in various characteristics can be formed.

The ratio by weight of the graft (branch) part/principal chain (trunk) part of the graft polymer is preferably 20/80 to 80/20 and more preferably 30/70 to 70/30. When the ratio by weight of the graft part is less than 20%, this is undesirable because the solubility, viscosity, fluidity and ejecting performance are deteriorated. Also, the ratio by weight of the principal chain part is less than 20%, this is undesirable because the dispersibility of a pigment is deteriorated.

Moreover, the solubility of the ink in a solvent, various properties such as the solvent resistance of the coating film, the dispersion stability of a pigment, dying ability, film hardness and film strength can be controlled by changing the acid value and amine value of the graft polymer.

Though (1) a method in which a monomer is polymerized with a polymer in the presence of a peroxide catalyst to achieve grafting by abstracting hydrogen, (2) a method in which a polymer having a functional group bonded to one terminal thereof is made to undergo an addition-reaction with a polymer having other functional group and (3) a method in which a polymerizable polymer (macro monomer) is copolymerized with a monomer may be utilized, the macro monomer method is preferable from the point of view that the purity of a product is high. As the procedures of the synthesis of the graft polymer, the specific examples described in the Paragraph Nos. 0094 to 0105 in the publication of Japanese Patent Application Laid-Open No. 2002-201387 may be referred to.

The ink used in the present invention is one used in the ink jet system and therefore, the molecular weight of the polymer having a relatively high molecular weight is preferably 25,000 or less in terms of weight average molecular weight so as to prevent the occurrence of such a phenomenon that too high viscosity adversely affects the ejecting performance of the ink to be ejected from the ejection head.

The polymer having a relatively high molecular weight is preferably contained in a ratio of 1 to 50% by weight based on the total weight of a solid in the ink-jet ink.

ii) Polyfunctional Polymerizable Component

In the case of using a polymer which has a relatively high molecular weight and the polymerizing ability to be itself polymerized and cured, it is preferable to combine polyfunctional polymerizable components such as polyfunctional monomers or oligomers to improve the strength of the coating film and adhesion to the substrate. A molecule of the polymerizable polymer having a relatively high molecular weight is polymerized not only among polymers having a relatively high molecular weight but also with other polymerizable components such as the polyfunctional monomers, to form a network with the result that the polymer is cured.

As the polyfunctional polymerizable component forming a network structure, di- or more functional monomer or oligomers may be used. Usually, tetra- or more functional monomers are used to impart sufficient film strength and adhesion to the photocurable resin.

However, since, particularly, the ink used in the present invention is used for the ink jet system, it is preferable to primarily use a difunctional or trifunctional monomer or oligomer relatively reduced in the number of functional groups and it is more preferable to use a difunctional to trifunctional monomer having a viscosity of 100 cps or less. This is because a rise in viscosity at the end of the head is scarcely caused during the jetting operation in the ink jet system, so that the head is not clogged, thus leading to stable ink ejecting performance during the operation, and therefore, the amount and direction of the ink to be jetted are stabilized, thus the ink can be uniformly attached on the substrate exactly in accordance to a predetermined pattern.

Examples of the difunctional to trifunctional monomer may include 1,6-hexanedioldiacrylate, ethylene glycol dimethacrylate, 1,4-butandioldiacrylate, neopentyl glycol diacrylate, tripropylene glycol diacrylate, polyethylene glycol diacrylate, polypropylene glycol diacrylate, trimethylolpropane triacrylate and 3-butylene glycol dimethacrylate.

In the ink-jet ink used in the present invention, usually, a di- to tri-functional monomer can be preferably contained in a ratio of 20 to 70% by weight based on the total weight of a solid in the ink-jet ink.

The reason is as follows. When the ratio of the di- to tri-functional monomer is less than 20% by weight based on all solid, the ink-jet ink is insufficiently diluted with the monomer and the viscosity of the ink is high from the beginning or after a solvent is vaporized, and there is therefore a fear of clogging of the nozzle of the ink jet head. Also, when the ratio of the di- to tri-functional monomer to be compounded exceeds 70% by weight based on all solid, the crosslinking density of the coating film is decreased, thus bringing about inferior solvent resistance to the coating film, adhesion and hardness and there is therefore a fear that only insufficient characteristics are obtained.

When all the polyfunctional monomers to be compounded in the ink-jet ink are di- to tri-functional monomers, the rise in viscosity is scarcely caused by the drying of the ink and therefore, the ejecting performance of the ink jet head is stabilized. However, on the contrary, there is the case where the film strength, adhesiveness to the substrate and solvent resistance of the cured layer obtained by curing the ink layer are unsatisfactory. For this reason, a polyfunctional monomer or oligomer having four or more functions can be contained in an appropriate amount together with the di- to tri-functional monomer to thereby raise the crosslinking density, whereby sufficient film strength and adhesion can be imparted to the pattern of the cured layer.

Examples of the polyfunctional monomer having four or more functions may include pentaerythritol tetraacrylate, pentaerythritol tetramethacrylate, dipentaerythritol pentaacrylate, dipentaerythritol hexaacrylate and dipentaerythritol hexamethacrylate.

Usually, the polyfunctional component having four or more functions can be preferably contained in a ratio of 1 to 30% by weight based on the total solid weight of the ink-jet ink.

In the ink-jet ink according to the present invention, the ratio of the polyfunctional components having four or more functions to be compounded to 100 parts by weight of the di- to tri-functional monomers is designed to be usually 1 to 50 parts by weight, and preferably, the lower limit of this ratio is designed to be 2 parts by weight or more and/or the upper limit of this ratio is designed to be 35 parts by weight or less, to acquire the balance between the characteristics as to ejection sustainability obtained by the di- to tri-functional monomers and the characteristics as to an improvement in strength and adhesiveness obtained by the polyfunctional component having four or more functions.

The reason is as follows. When the ratio of the polyfunctional component having four or more functions to 100 parts by weight of the di- to tri-functional monomers is less than 1 part by weight, there is a fear that the characteristics such as the hardness after the ink is cured and solvent resistance can not sufficiently obtained. Also, when the ratio of the polyfunctional component having four or more functions exceeds 50 parts by weight, there is a fear that the curing speed of the ink is lower, thus leading to lower process speed.

iii) Monofunctional Polymerizable Component

A monofunctional monomer or oligomer may be compounded in the photocurable binder forming system as necessary.

Examples of the monofunctional monomer or oligomer may include vinyl monomers such as styrene and vinyl acetate and monofunctional acrylate monomers such as n-hexylacrylate and phenoxyethylacrylate.

iv) Photoinitiator

A photoinitiator having activity to the wavelength of a light source to be used is usually compounded in the photocurable binder forming system. As the photoinitiator, an appropriate one is adequately selected in consideration of a difference in the reaction system of the resin and polyfunctional monomer (for example, radical polymerization and cation polymerization) and the type of each material. For example, the following photoinitiators may be used. Examples of these photoinitiators include 1-hydroxycyclohexyl-phenyl ketone, 2,2-dimethoxy-1,2-diphenylethan-1-one, 2-methyl-1-[4-(methylthio)phenyl]-2-morpholinopropan-1-one, 2-benzyl-2-dimethylamino-1-(4-morpholinophenyl)-butan-1-one, 2-hydroxy-2-methyl-1-phenyl-propan-1-one, 1-[4-(2-hydroxyethoxy)phejnyl]-2-hydroxy-2-methyl-1-propane-1-one, 2,4,6-trimethylbenzoyldiphenyl-phosphine oxide, bisacylphosphine oxide, benzomethyl ether, benzoinisobutyl ether, benzoinisopropyl ether, 2-isopropylthioxanthone, 2,4- diethylthioxanthone, 2-(3-dimethylamino-2-hydroxypropoxy)-3,4-dimethyl-9H-thioxanthone-9-one mesochloride, benzophenone, methyl o-benzoylbenzoate, 4-benzoyl-4'-methyl-diphenylsulfide, 3,3',4,4'-tetra(t-butylperoxycarbonyl), ethyl p-dimethylaminobenzoate, isoamyl p-dimethylaminobenzoate, 1,3,5-triacroylhexahydro-s-triazine, 2-[2-(5-methylfuran-2-yl)ethenyl]-4,6-bis(trichloromethyl)-s-triazine, 2-[2-(furan-2-yl)ethenyl]-4,6-bis(trichloromethyl)-s-triazine, methylbenzoyl formate, and 2,4,6-trimethylbenzoyldiphenylphosphine oxide.

The content of the photoinitiator is preferably 0.1 to 5% by weight and more preferably 0.5 to 2% by weight based on all solid.

The total ratio of the binder forming system components to the total weight of the solid of the ink including pigments and other components is preferably designed to be 25% by weight or more.

In the ink-jet ink in the method of producing a color filter according to the present invention, the ratio (P/V ratio) of the weight of the pigments to the sum of the weights of the pigment dispersing agent and binder can be 0.5 to 1.0 and preferably 0.5 to 0.9 when forming an R-pixel, 0.5 to 1.2 and preferably 0.7 to 1.0 when forming a G-pixel and 0.3 to 0.6 and preferably 0.3 to 0.5 when forming a B-pixel. Such a ink is desirable from the points of the balance between the ejecting performance of ink, the prevention of the running over of ink and the film properties obtained. When the P/V ratio is reduced, it is necessary to increase the amount of liquid droplets of the ink to be attached to the pixel forming region, and there is the case where such a problem arises that the ink runs out of the pixel forming region. When the P/V ratio is too high, on the other hand, there is the case where the problems arise as to a deterioration in ejecting performance, for example, clogging of the ejection head and generation of deflection of jetting direction, and coarse film surface.

The solid concentration based on the total weight of the ink-jet ink for color filter is preferably 15 to 25% by weight and more preferably 18 to 22% by weight. When the solid content is too low, it is necessary to increase the amount of an ink liquid, giving rise to the problem concerning ink break in the patterning operation. When the solid concentration is too high on the other hand, there is the case where the problems arise as to deterioration in ejecting performance, for example, clogging of the ejection head and generation of deflection of jetting direction.

(Solvent)

In the ink-jet ink used in the present invention, a solvent is contained to adjust the ink condition under which the ink is stored as a highly concentrated solution or used as a solution which can be instantly jetted from the head.

The ink-jet ink used in the present invention can use, as its main solvent, a solvent component having a boiling point of 180° C. to 260° C. and preferably 210° C. to 260° C. and a vapor pressure of 0.5 mmHg or less and preferably 0.1 mmHg or less at ordinary temperature (particularly in a range from 18° C. to 25° C.), wherein the main solvent can be contained in a ratio of 60% by weight or more based on the total amount of the solvent.

The solvent component having a boiling point of 180° C. to 260° C. and a vapor pressure of 0.5 mmHg or less at ordinary temperature has adequate drying characteristics and vaporizing characteristics. When a single solvent or mixture solvent containing such a solvent component in a high ratio is used, the ink-jet ink is not dried rapidly at the end of the nozzle of the ejection head and therefore, a sharp rise in the viscosity of the ink and clogging with the ink do not occur and therefore, the stability and straight-forwarding characteristics of the jetting direction are not adversely affected. Accordingly, the position of a pixel for which preciseness is required can be controlled with high accuracy and also, the average film thickness can be uniformly controlled.

Also, because drying of the ink proceeds at a proper speed after jetting it on the surface on which the ink is jetted, it is dried rapidly and perfectly by natural drying or a general heating step after the surface on which the ink is jetted is flatted and smoothed, thus making it possible to control the ink within the range of a pixel form according to the present invention. Moreover, this ink is more reduced in the fear that a solvent is left in the coating film after the drying step as compared with the case of using a humidifier or a solvent having an extremely high boiling point.

The organic solvent may contain a solvent component other than the main solvent as necessary, if the amount of the solvent component is a little. However, in this case, the main solvent having the boiling point and vapor pressure above is used in a ratio of 60% by weight or more based on the total amount of the solvent. When the ratio of the main solvent is less than 60% by weight based on the total amount of the solvent, there is the case where drying characteristics and vaporizing characteristics adequate to the inkjet system cannot be obtained exactly.

The main solvent is desirably used in a ratio as high as possible and specifically in a ratio of 60% by weight or more, preferably 80% by weight or more, more preferably 90% or more and, if possible, 100% by weight.

In the case where a wettability variable layer is formed on the surface of the substrate and exposed to light to thereby form an inkphilic region on the part where the ink layer is intended to be formed and the ink-jet ink of the present invention is selectively attached to the inkphilic region by the ink jet system, the standard solution shown in the wettability test prescribed in JIS K6768 is used as its main solvent and liquid droplets of the standard solution are brought into contact with the ink layer to measure the contact angle (θ) after 30 seconds. Then, an ink-jet ink may be selected and used which has the characteristics that the contact angle of the surface of a test piece having a critical surface tension of 30 mN/m which tension is found from a graph of Jisman plot is 25° or more and preferably 30° or more and the contact angle of the surface of a test piece having a critical surface tension of 70 mN/m which tension is measured in the same method is 10° or less.

When the ink is prepared using a solvent exhibiting the behavior as to the wettability, the ink exhibits high repellency to the surface of the wettability variable layer before the wettability of the wettability variable layer is changed as will be explained later and exhibits high affinity to the surface of the wettability variable layer after the wettability of the wettability variable layer is varied in wettability towards the higher hydrophilic side. It is therefore allowed to adopt a difference in wettability for the ink between a hydrophilic region formed by selectively exposing a part of the surface of the wettability variable layer and an ink repellent region around the hydrophilic region. This brings about the situation where the ink jetted on the inkphilic region by the ink jet system is spread uniformly to every corner of the inkphilic region. As a result, a fine and exquisite ink layer pattern can be formed by the ink jet system.

Here, the test piece having the characteristics above as to the critical surface tension may be formed of any material without any problem. As the test piece with a 30 mN/m critical surface tension, one meeting this requirement can be picked up from among, for example, polymethyl methacrylate, polyvinyl chloride, polyvinylidene chloride and polyethylene terephthalate having a smooth surface respectively, one produced by coating any one of the above polymers, a surface modifying agent or the like on a smooth surface of the glass or the like, by practically carrying out the above-mentioned test. Further, as the test piece with a 70 mN/m critical surface tension, it can be picked up from among, for example, nylon, one produced by subjecting a surface of glass to the hydrophilic treatment or the like, by practically carrying out the above-mentioned test.

As the main solvent, an appropriate one may be selected from the following solvents and used: glycol ethers such as ethylene glycol monoethyl ether and diethylene glycol diethyl ether; glycol ether esters such as ethylene glycol monomethyl ether acetate; glycol oligomer ethers such as diethylene glycol monomethyl ether; glycol oligomer ether esters such as diethylene glycol monomethyl ether acetate; aliphatic or aromatic esters such as ethyl acetate and propyl benzoate; dicarboxylic acid diesters such as diethyl carbonate; alkoxycarboxylic acid esters such as methyl 3-methoxypropionate; keto-carboxylic acid esters such as ethyl acetoacetate; alcohols or phenols such as ethanol, isopropanol and phenol; aliphatic or aromatic ethers such as diethyl ether and anisole; alkoxy alcohols such as 2-ethoxyethanol and 1-methoxy-2-propanol; glycol oligomers such as diethylene glycol and tripropylene glycol; alkoxy alcohol esters such as 2-ethoxyethyl acetate; and ketones such as acetone and methyl isobutyl ketone.

Also, since a pigment is contained in the ink-jet ink for color filter which is used in the present invention, particularly, a material containing no hydroxyl group is preferably used as the main solvent which occupies a large part of the solvent. Ink having high pigment dispersibility and dispersion stability can be obtained by using such a main solvent. Also, when the heatcurable binder forming system is used, the aforementioned problem that an epoxy group is decomposed during the synthetic reaction can be evaded.

Preferable examples of the main solvent may include ethylene glycol monobutyl ether acetate, diethylene glycol monobutyl ether acetate, diethylene glycol monoethyl ether acetate, diethylene glycol diethyl ether, diethylene glycol dibutyl ether, diethyl adipate, dibutyl oxalate, dimethyl malonate, diethyl malonate, dimethyl succinate and diethyl succinate. These solvents are preferable from the point that they not only fulfill the requests that each has a boiling point of 180° C. to 260° C. and a vapor pressure of 0.5 mmHg or less at ordinary temperature, but also contain no hydroxyl group in each molecule. Moreover, these solvents may be mixed or not mixed with a solvent which has been used for the preparation of a pigment dispersing solution, such as 3-methoxybutyl acetate and propylene glycol monomethyl ether acetate (PGMEA) and has high dispersibility and used as a dispersing solvent as it is to prepare a pigment dispersion solution.

The solvent exemplified above as preferable examples also fulfill the requests that in the wettability test prescribed in JIS K6768, in which the standard solution shown in the test is used and liquid droplets of the standard solution are brought into contact with the ink layer to measure the contact angle (θ) after 30 seconds, an ink-jet ink has the characteristics that the contact angle of the surface of a test piece having a critical surface tension of 30 mN/m which tension is found from a graph of Jisman plot is 25° or more and the contact angle of the surface of a test piece having a critical surface tension of 70 mN/m which tension is measured in the same method is 10° or less. Therefore, each of these solvents may be preferably used as the main solvent also in the case of forming the wettability variable layer on the surface of the substrate, followed by exposing, and making the ink-jet ink selectively adhere by utilizing a difference in wettability between the exposed part and the unexposed part.

Also, because a hydroxyl group of a water molecule is present when water is mixed in a solvent, there is a fear that the same problem as that in the case of using a solvent having a hydroxyl group arises. Therefore, it is desirable to prepare an ink-jet ink by using an organic solvent less miscible with water. From this point of view, the solubility of the solvent in water in the preparation of the ink-jet ink is preferably 20 parts or less based on 100 parts by weight of water at a liquid temperature of 20° C.

Among the main solvents given above as the specific examples, diethylene glycol monobutyl ether acetate has no hydroxyl group and exhibits such less miscibility that it has a solubility of 6.5% by weight in 100 parts by weight of water at 20° C. and is therefore particularly preferable.

The solvent can be usually used in a ratio of 75 to 85% by weight based on the total amount of the ink-jet ink containing the solvent to prepare an ink-jet ink. When the amount of the solvent is too small, the viscosity of the ink-jet ink is high, so that, in the case of the ink-jet ink, it is difficult to jet the ink from the ink jet head. The amount of the solvent is too large, a film of the ink deposited on a prescribed wettability variable position (ink layer formation position) breaks before the amount of the ink to be filled (amount of the deposited ink) is not enough, so that the ink runs out to the surrounding unexposed part and further spreads to the adjacent wettability variable position (ink layer formation position). In other words, the amount of the ink which can be filled without running out of the wettability variable part (ink layer formation position) to which the ink must be attached, is insufficient, so that the thickness of the dried film is so low and along with this, only insufficient transmission concentration is obtained.

When, in the present invention, particularly, the solvent component having a boiling point of 180° C. to 260° C. and a vapor pressure of 0.5 mmHg or less is used in a combination ratio of 90% by weight or more of the total solvent, occasionally a dispersing solvent, such as 3-methoxybutyl acetate or propylene glycol monomethyl ether acetate (PGMEA) which has been used so far can be only insufficiently used in the preparation of a pigment dispersion solution. In this case, among solvents usable as the main solvent, a solvent relatively superior in the dispersibility and dispersion stability of a pigment is selected and mixed with a dispersing solvent currently used to obtain a mixture solvent as the dispersing solvent to be used or the main solvent is used as it is as the dispersing solvent.

(Leveling Agent)

The ink-jet ink used in the present invention may contain a leveling agent as necessary. As the leveling agent, it is preferable to use, for example, an acryl type surfactant, fluorine type surfactant, silicone type surfactant or vinyl ether type surfactant which will be shown below.

It is inferred that when the leveling agent is contained in the ink, the leveling agent diffuses on the entire surface of the film, so that the surface tension is uniformed on the entire pixel part and further, the vaporization of the solvent from the surface is uniformed to thereby suppress a difference in viscosity. Therefore, the flow of the solute during the course of the drying process is stopped or limited, with the result that a rise of the edge part when the film is formed is reduced. Also, when an acryl type surfactant is used in the ink-jet ink for color filter according to the present invention, this has such an advantage that no problem arises as to, particularly, electric characteristics and such recoat characteristics that the overcoat layer to be formed on a pixel is easily repelled. A fluorine type surfactant also has the effect of preventing the edge of a pixel from generating a thick film part. However, when the fluorine type surfactant is used, it is contained to the extent that the recoat characteristics are not impaired.

When leveling agent is added, it is usually added after the pigment dispersion step.

(Acryl Type Surfactant)

Here, the acryl type surfactant means surfactants containing polymers obtained from aryl monomers. Among these acryl type surfactants, a polymer obtained using an alkyl acrylate monomer is preferable, a polymer obtained using an alkyl acrylate monomer in which at least the alkyl group has 2 to 9 carbon atoms is more preferable from the point of making difficult to produce a thick film part at the edge of the film.

Examples of the alkyl acrylate monomer in which the alkyl group has 2 to 9 carbon atoms include ethylacrylate, normal propylacrylate, isopropylacrylate, normal butylacrylate, isobutylacrylate, tertiary butylacrylate, normal octylacrylate, 2-ethylhexylacrylate and isononylacrylate.

The acryl type surfactant used in the present invention may be a copolymer such as a copolymer or terpolymer which contains at least the alkylacrylate monomer above, and is further constituted of two or more types of monomers using other monomers having an ethylenic double bond. Among these compounds, a homopolymer of the alkylacrylate monomer above or a copolymer such as a copolymer or terpolymer which is obtained by selecting and using two or more of the alkylacrylate monomer above. In the case where, in these copolymers, all the comonomers are alkylacrylate comonomers containing an alkyl group having 2 to 9 carbon atoms, there is no limitation to the ratio of these comonomers.

Examples of the method of synthesizing the alkylacrylate polymer or copolymer include the emulsion polymerization method, suspension polymerization method, solution polymerization method and block polymerization method, and as the initiator used to carryout polymerization, an azo polymerization initiator and peroxide which are usually used may be used.

Also, the weight average molecular weight of the acryl type surfactant is preferably 1000 to 100000 and more preferably 1000 to 60000 from the point of the effect of preventing the edge of the film from generating a thick film part. The weight average molecular weight in the present invention is a calibrated value based on polystyrene in GPC measurement.

The SP value of the acryl type surfactant is preferably 8 to 9 and more preferably 8 to 8.5 from the point of the effect of preventing the edge of the film from generating a thick film part. A difference between the SP value of the acryl type surfactant and that of the binder forming system to be used is preferably 1 to 1.5 and it is also preferable that the SP value of the acryl type surfactant be lower by 1 to 1.5 than that of the binder forming system to be used. The reason is inferred to be that when the SP value of the acryl type surfactant is in the range above, the acryl type surfactant is made incompatible with the binder forming system and tends to be concentrated to the vicinity of the surface in the coated ink and the surfactant is diffused on the entire surface of the coating film when drying or heating operations are carried out, which strengthens the surface tension of the entire surface of the coating film and the drying from the surface of the coating film tends to be uniformed. On the other hand, when the SP value is smaller than the range above, there is the case where the effect of the leveling agent is only insufficiently produced. Also, when the SP value is larger than the range above, the ink is scarcely spread uniformly on the substrate and there is the possibility that the cured coating film is surface-roughened.

Here, the SP value means an index showing the compatibility or incompatibility among materials. If there is a small difference in SP value between two materials to be mixed, both materials have large compatibility and mutual solubility and therefore exhibiting easy solubility, whereas if there is a large difference in SP value between two materials to be mixed, both materials have small compatibility and mutual solubility and therefore exhibiting poor solubility or insolubility.

Though there are several methods for measuring or calculating the SP value, the calculation method described in Michael M. Coleman, John F. Graf, Paul C. Painter (Pennsylvania State Univ.), "Specific Interactions and the Miscibility of polymer Blends" (1991), Technomic Publishing Co., is used in the present invention. However, because there is no description about a —COOH group and a —OH group, the values described in R. F. Fedors "Polymer Engineering and Science, 14(2), 147, (1974)" are used.

In the acryl type surfactant used in the present invention, other components may be added as long as a polymer obtained from an acryl monomer is contained as a major component or the polymer obtained from an acryl monomer may be chemically modified.

As commercially available products of the acryl type surfactant, products (trade name: L-1983-50, 230, L-1982-50, L-1984-50, LHP-95 and the like) manufactured by Kusumoto Chemicals, Ltd. are preferably used.

The content of the acryl type surfactant is preferably 0.001 to 5% by weight, more preferably 0.001 to 2% by weight and even more preferably 0.01 to 1.5% by weight based on all solid from the point of preventing the edge of the film from generating a thick film part. When the content of the acryl type surfactant is less than 0.001% by weight, no desired effect is produced and there is a fear that the edge of the film is thickened, whereas when the content of the acryl type surfactant exceeds 5% by weight, there is a fear that the edge of the coating film becomes so low that white voids of the edge of a pixel are generated. Here, the solid of the ink-jet ink which is used to define the combination ratio contains all components excluding a solvent and a liquid polymerizable monomer and the like are included in this solid. Also, the content of the acryl type surfactant is expressed as the content of the solid of the acryl type surfactant.

(Fluorine Type Surfactant)

The fluorine type surfactant in the present invention means surfactant containing fluorine. The fluorine type surfactant is one obtained usually by substituting all or a part of hydrogen atoms which are hydrophobic groups of a hydrocarbon type surfactant with fluorine atoms.

The fluorine type surfactant used in the present invention is preferably a fluorine type copolymer polymerized using at least a monomer (A) containing a fluorinated alkyl group and an ethylenic double bond and a monomer (B) containing a silicone chain and an ethylenic double bond from the point of preventing the edge of the film from generating a thick film part.

As the monomer (A) containing a fluorinated alkyl group and an ethylenic double bond, specifically, compounds containing plural perfluoroalkyl groups in one molecule such as compounds represented by the following formula (a1) and compounds represented by the following formula (a2) are given as examples, though known ones may be used.

[Formula 11]

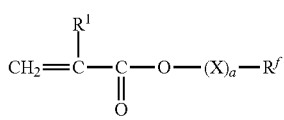
(a1)

In the formula, $R^f$ represents a perfluoroalkyl group or a partially fluorinated alkyl group having 1 to 20 carbon atoms, wherein each of these alkyl groups may be linear or branched or may be one in which an oxygen atom is introduced into its principal chain (for example, $-(OCFCF_2)_2CF(CF_3)_2$), $R^1$ represents H, $CH_3$, Cl or F, X represents a divalent connecting group and "a" denotes 0 or 1.

[Formula 12]

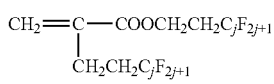
(a2)

In the formula "j" denotes an integer from 1 to 14.

As X in the formula (a1), connecting chains represented by the following formula are given as examples.

[Formula 13]

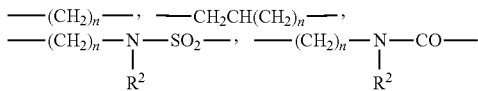

In the formula, "n" denotes an integer from 1 to 10 and $R^2$ represents H or an alkyl group having 1 to 6 carbon atoms.

[Formula 14]

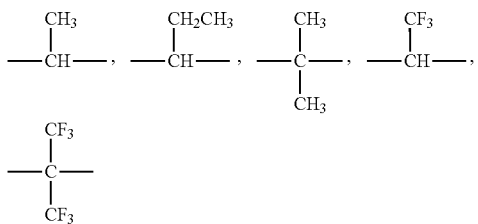

The number of carbon atoms of the perfluoroalkyl group or partially fluorinated alkyl group in the monomer (A) containing a fluorinated alkyl group and an ethylenic double bond is preferably 3 or more and more preferably 6 or more. Specific examples of the monomer (A) containing a fluorinated alkyl group and an ethylenic double bond include compounds represented by the following formulae (a-1) to (a-56).

[Formula 15]

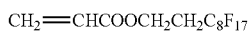
a-1

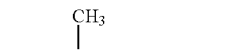
a-2

a-3

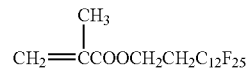
a-4

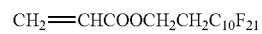
a-5 a-6

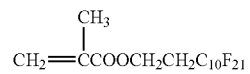

a-7 a-8

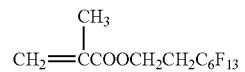

a-9 a-10

a-11

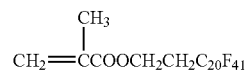

[Formula 16]

a-12

a-13

a-14

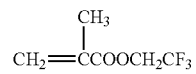

a-15

a-16

a-17

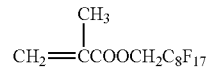

a-18

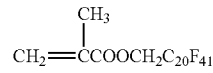

a-19

a-20

a-21

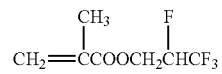

a-22

[Formula 17]

a-23 a-24

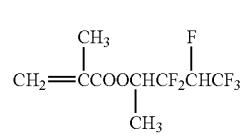

a-25 $CH_2=CCOOCHC_{10}F_{21}$ with $CH_3$ above C and $C_2H_5$ below a-26 $CH_2=CHCOOCH_2(CF_2)_2H$ a-27 $CH_2=CCOOCH_2(CF_2)_2H$ with $CH_3$ above C a-28 $CH_2=CHCOOCH_2(CF_2)_4H$ a-29 $CH_2=CHCOOCH_2CF_3$ a-30 $CH_2=CCOO(CF_2)_4H$ with $CH_3$ above C a-31 $CH_2=CHCOOCH_2(CF_2)_6H$ a-32 $CH_2=CCOOCH_2(CF_2)_6H$ with $CH_3$ above C a-33 $CH_2=CHCOOCH_2(CF_2)_8H$

[Formula 18]

a-34 $CH_2=CCOOCH_2(CF_2)_8H$ with $CH_3$ above C a-35 $CH_2=CHCOOCH_2(CF_2)_{10}H$ a-36 $CH_2=CHCOOCH_2(CF_2)_{12}H$ a-37 $CH_2=CHCOOCH_2(CF_2)_{14}H$ a-38 $CH_2=CHCOOCH_2(CF_2)_{18}H$ a-39 $CH_2=CHCOOC(CF_2)_4H$ with $CH_3$ above and $CH_3$ below C a-40 $CH_2=CHCOOCH_2CH_2(CF_2)_7H$ a-41 $CH_2=CCOOCH_2CH_2(CF_2)_7H$ with $CH_3$ above C a-42 $CH_2=CCOOC(CF_2)_6H$ with $CH_3, CH_3$ above and $CH_3$ below a-43 $CH_2=CHCOOCHC_8F_{17}$ with $CF_3$ below

[Formula 19]

a-44 $CH_2=CHCOOCH_2CF_2CF_3$ a-45 $CH_2=CHCOOCH_2CHCH_2C_8F_{17}$ with OH below a-46 $CH_2=CCOOCH_2CH(CH_2)_4C_{18}F_{37}$ with $CH_3$ above C and OH below a-47 $CH_2=CHCOOCH_2CH_2NSO_2C_8F_{17}$ with $C_3H_7$ above N a-48 $CH_2=CCOOCH_2CH_2NSO_2C_6F_{13}$ with $CH_3$ above C and $CH_3$ above N a-49 $CH_2=CCOO(CH_2)_6NHSO_2C_{12}F_{25}$ with Cl above C a-50 $CH_2=CHCOOCH_2CH_2NCOC_7F_{15}$ with $C_2H_5$ above N a-51 $CH_2=CHCOO(CH_2)_8NCOC_{12}F_{25}$ with $CH_3$ above N a-52 $CH_2=CHCOO(CH_2)_2(CF_2)_8CF(CF_3)_2$ a-53 $CH_2=CHCOOCH_2CH_2NSO_2C_8F_{17}$ with $C_2H_5$ above N a-54 $CH_2=CCOOCH_2CH_2NSO_2C_6F_{13}$ with $CH_3$ above C and $C_2H_5$ above N a-55 $CH_2=CCOOCH_2CH_2NSO_2C_8F_{17}$ with $CH_3$ above C and $C_3H_7$ above N a-56 $CH_2=CCOOCH_2CH_2C_8F_{17}$ with $CH_2CH_2C_8F_{17}$ above C As the monomer (A) containing a fluorinated alkyl group and an ethylenic double bond, a single compound may be used or two or more compounds may be combined.

On the other hand, as the monomer (B) containing a silicone chain and an ethylenic double bond, known ones may be used and those in which an ethylenic double bond such as a vinyl group, acryloyl group or methacryloyl group is connected to one terminal or both terminals of a polysiloxane chain through a divalent connecting group are preferable. The monomer (B) containing a silicone chain and an ethylenic double bond preferably contains a (meth)acryloyl group from the viewpoint of a polymerization reactivity.

Specific examples of the monomer (B) containing a silicone chain and an ethylenic double bond include compounds represented by the formula (b-1) or compounds represented by the formula (b-2).

[Formula 20]

$$Z^1-\left[\begin{array}{c}R^3\\|\\Si-O\\|\\R^4\end{array}\right]_p\begin{array}{c}R^3\\|\\Si\\|\\R^4\end{array}-(X^2)_q-\begin{array}{c}R^1\\|\\C=CH_2\end{array} \quad (b-1)$$

In the formula, $R^3$ and $R^4$ respectively represent an alkyl group having 1 to 20 carbon atoms or a phenyl group and may be the same or different for every siloxy unit. "p" denotes an integer from 3 to 520, "q" denotes 0 or 1, $X^2$ represents a divalent connecting group and specifically represents a connecting chain represented by the formula —$CH_2CH(OH)$ CH$_2$OCO—, —(CH$_2$)$_{n1}$NHCH$_2$CH(OH)CH$_2$OCO—, —(CH$_2$)$_{n1}$OCO—, —(CH$_2$)$_{n1}$—O—(CH$_2$)$_{m1}$OCO— or —OCH$_2$CH(OH)CH$_2$OCO— (wherein n1 and m1 respectively represent an integer from 2 to 6.) R$^1$ represents the same group as those defined in the formula (a1), Z$^1$ represents a methyl group, a phenyl group or a group represented by the formula CH$_2$=C(R$^1$)—(X$^2$)$_q$—.

[Formula 21]

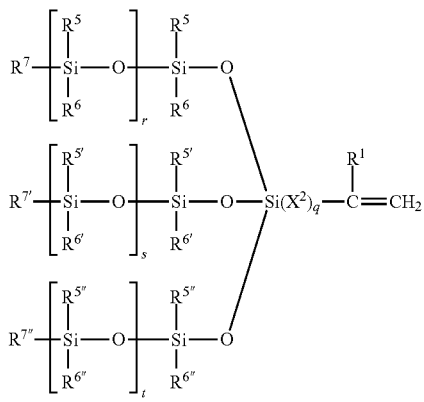
(b-2)

In the formula, R$^5$, R$^{5'}$R$^{5''}$, R$^6$, R$^{6'}$, R$^{6''}$, R$^7$, R$^{7'}$ and R$^{7''}$ respectively represent an alkyl group having 1 to 20 carbon atoms or a phenyl group. r, s and t respectively denote 0 or an integer from 1 to 200 and X$^2$, q and R$^1$ represent the same groups as those defined in the formula (b-1).

The molecular weight of the silicone chain part of the monomer (B) containing a silicone chain and an ethylenic double bond is preferably 5,000 or less and more preferably 1,000 or less. The structure of the silicone chain part is preferably a branched type as shown in the formula (b-2). Among these compounds, those in which "r", "s" and "t" in the formula (b-2) are respectively 0 are preferable.

Specific examples of the monomer (B) containing a silicone chain and an ethylenic double bond include compounds represented by the formulae (b-1-1) to (b-3-7).

[Formula 22]

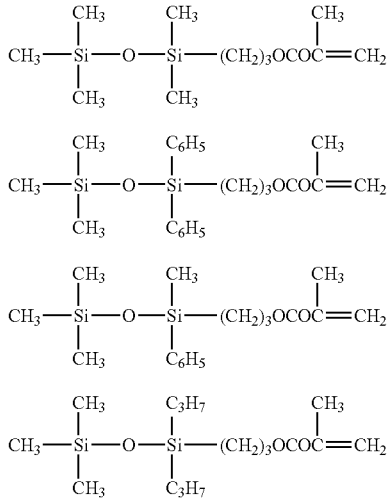

-continued

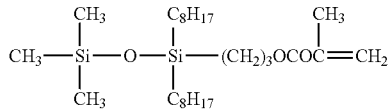
(b-1-5)

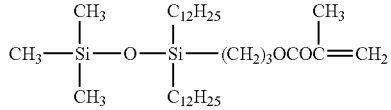
(b-1-6)

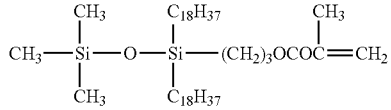
(b-1-7)

[Formula 23]

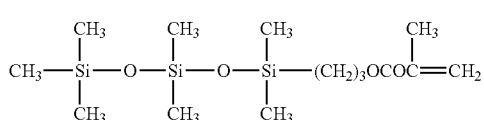
(b-1-8)

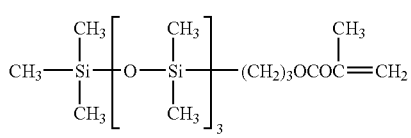
(b-1-9)

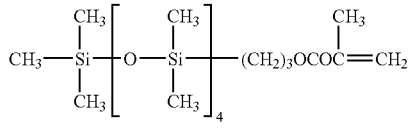
(b-1-10)

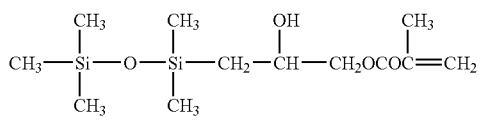
(b-1-11)

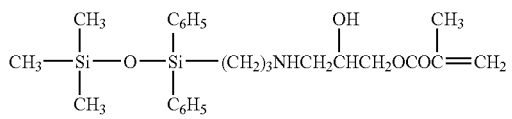
(b-1-12)

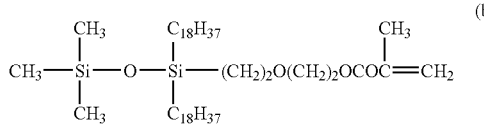
(b-1-13)

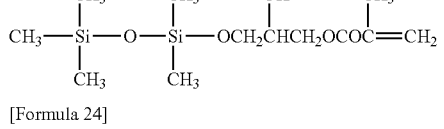
(b-1-14)

[Formula 24]

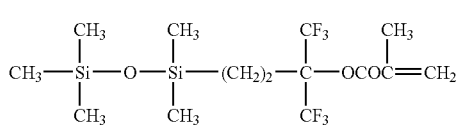
(b-1-15)

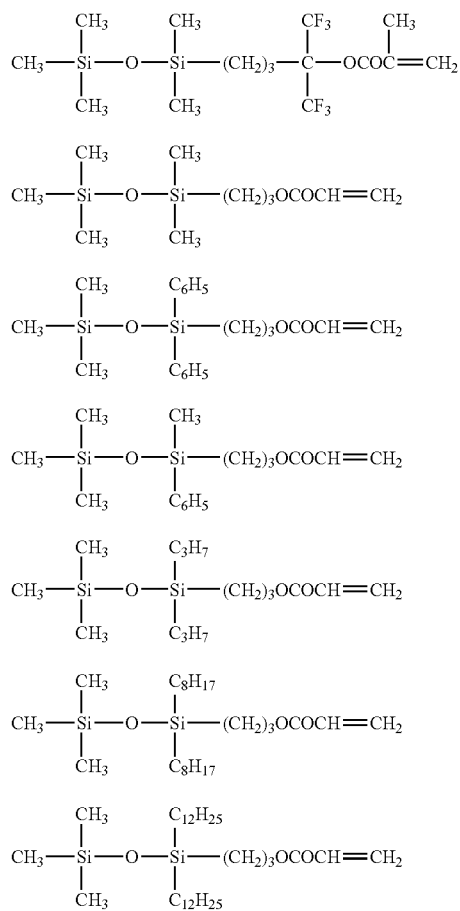
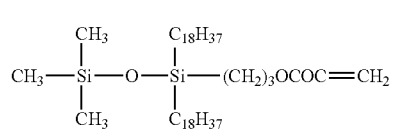
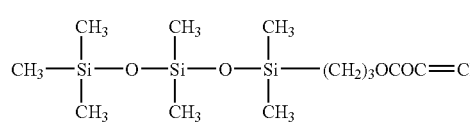
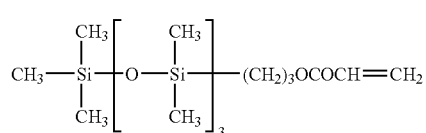
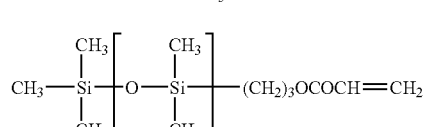
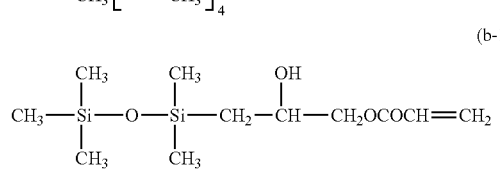
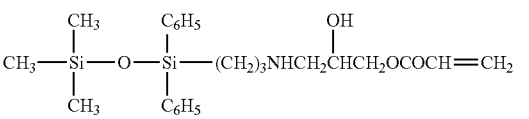
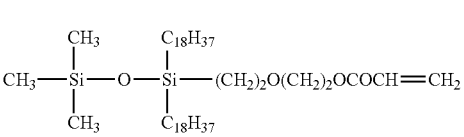
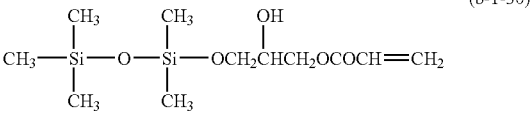
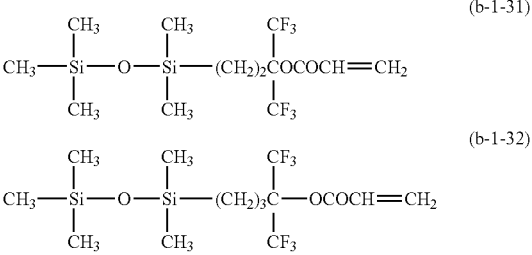
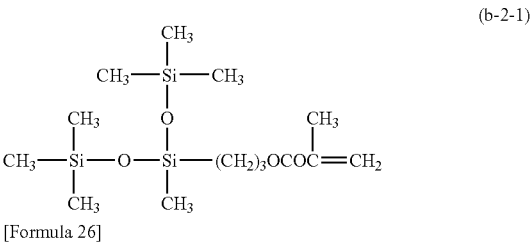
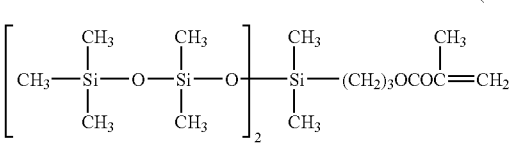
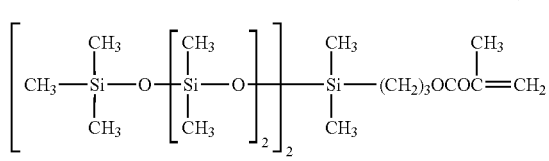
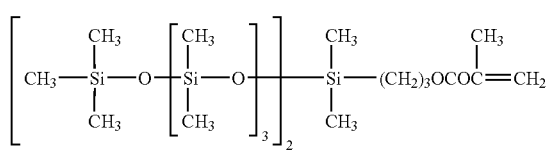
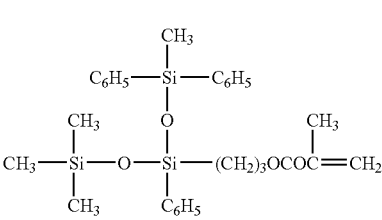

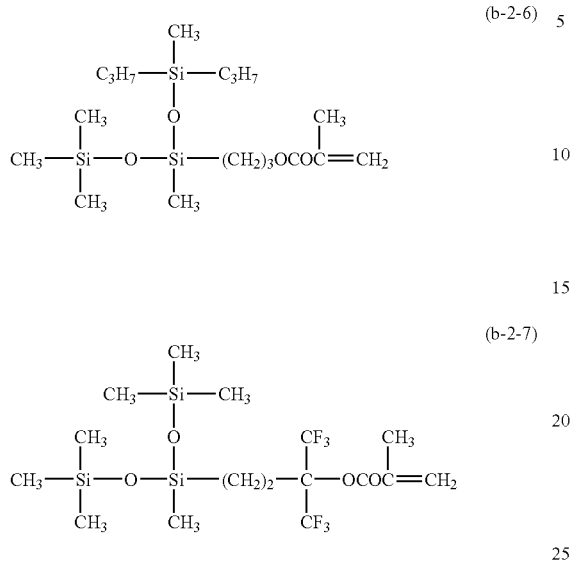
(b-2-6)
(b-2-7)
[Formula 27]
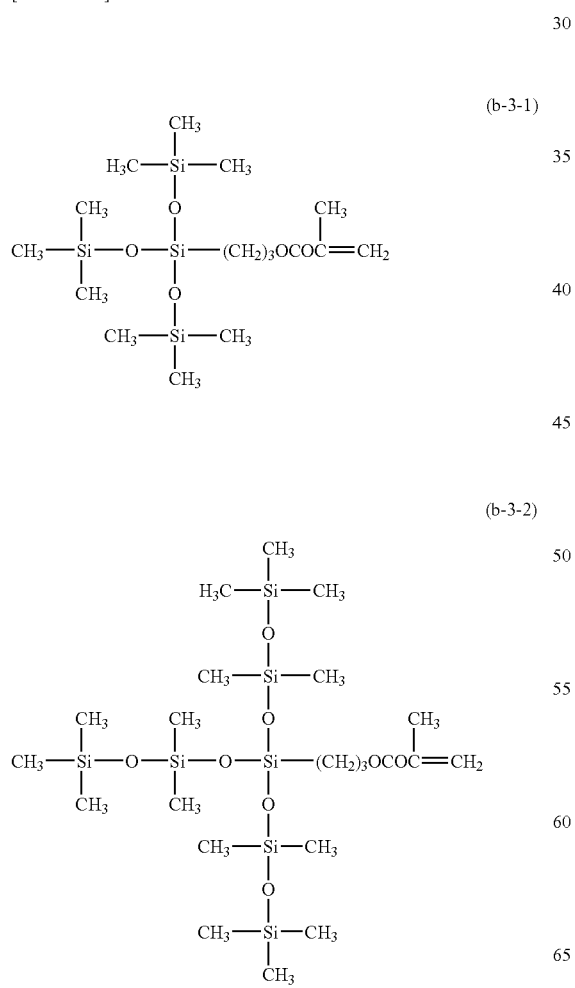
(b-3-1)
(b-3-2)
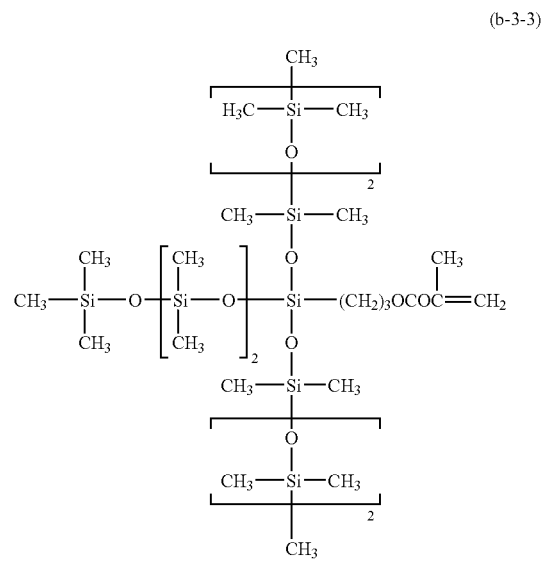
(b-3-3)
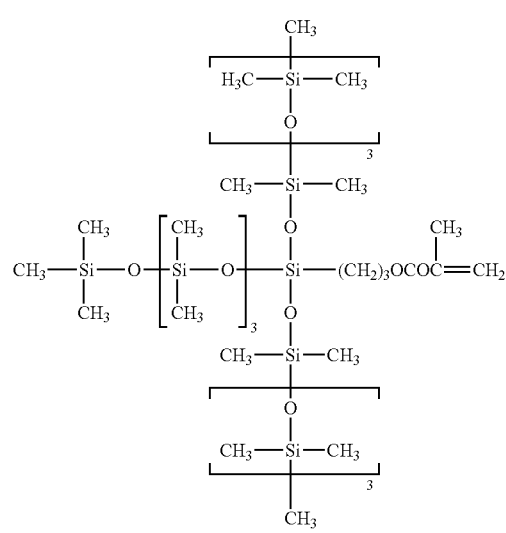
(b-3-4)
[Formula 28]
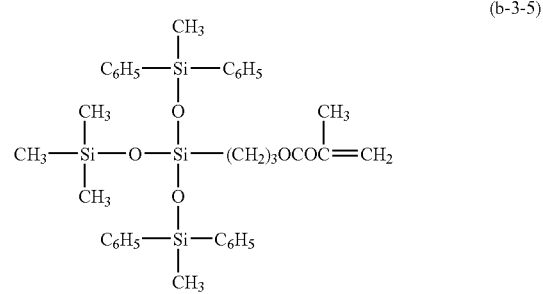
(b-3-5)

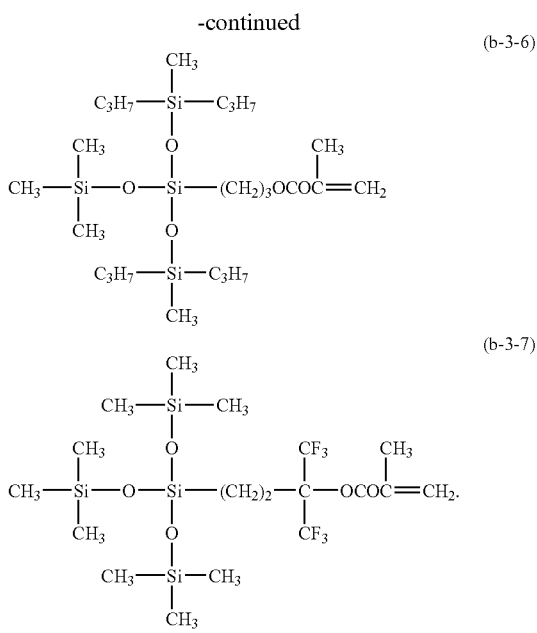

As the monomer (B) containing a silicone chain and an ethylenic double bond, a single compound may be used or two or more compounds may be combined.

The fluorine type surfactant used in the present invention preferably includes, particularly, a fluorine type copolymer polymerized using at least a monomer represented by (a-1) as the monomer (A) having a fluorinated alkyl group and an ethylenic double bond and a monomer represented by (b-3-1) as the monomer (B) having a silicone chain and an ethylenic double bond, or a fluorine type copolymer polymerized using at least a monomer represented by (a-56) as the monomer (A) having a fluorinated alkyl group and an ethylenic double bond and a monomer represented by (b-2-1) as the monomer (B) having a silicone chain and an ethylenic double bond from the point of preventing the edge of the film from generating a thick film part.

Also, the fluorine type surfactant used in the present invention may be those in which a non-fluorine and non-silicone type monomer having an ethylenic double bond is combined besides the monomer (A) containing a fluorinated alkyl group and an ethylenic double bond and the monomer (B) containing a silicone chain and an ethylenic double bond.

Examples of the non-fluorine and non-silicone type monomer containing an ethylenic double bond include styrene, nuclear-substituted styrene, acrylonitrile, vinyl chloride, vinylidene chloride, vinylpyridine, N-vinylpyrrolidone, vinylsulfonic acid and fatty acid vinyls such as vinyl acetate; α,β-ethylenic unsaturated carboxylic acids, for example, monovalent or divalent carboxylic acids such as acrylic acid, methacrylic acid, maleic acid, fumaric acid and itaconic acid, (meth)acrylates with an alkyl group having 1 to 18 carbon atoms such as methyl, ethyl, propyl, butyl, octyl, 2-ethylhexyl, decyl, dodecyl or stearyl esters of (meth) acrylic acids; hydroxyalkyl esters of (meth)acrylic acids, the alkyl group having 1 to 18 carbon atoms, such as a 2-hydroxyethyl ester, hydroxypropyl ester and hydroxybutyl ester; aminoalkyl esters of (meth) acrylic acids, the alkyl group having 1 to 18 carbon atoms, such as a dimethylaminoethyl ester, diethylaminoethyl ester and diethylaminopropyl ester; ether oxygen-containing alkyl esters of (meth)acrylic acids, the alkyl group having 3 to 18 carbon atoms, such as a methoxyethyl ester, ethoxyethyl ester, methoxypropyl ester, methylcarbyl ester, ethylcarbyl ester and butylcarbyl ester;

dicyclopentanyloxylethyl(meth)acrylate, isobronyloxylethyl(meth)acrylate, isobornyl(meth)acrylate, adamantyl (meth)acrylate, dimethyladamantyl(meth)acrylate, dicyclopentanyl(meth)acrylate, dicyclopentenyl(meth)acrylate, mono(meth)acrylates or di(meth)acrylates of polyalkylene glycol such as polyethylene glycol, polypropylene glycol or a copolymer of an ethylene oxide and propylene oxide, the glycols having a polymerization degree of 1 to 100, or mono (meth)acrylates of polyalkylene glycol such as polyethylene glycol, polypropylene glycol or a copolymer of an ethylene oxide and propylene oxide, the glycols being capped with an alkyl group having 1 to 6 carbon atoms and having a polymerization degree of 1 to 100;

alkyl vinyl ethers in which the alkyl group has 1 to 18 carbon atoms such as methyl vinyl ether, propylvinyl ether and dodecyl vinyl ether; glycidyl esters of (meth) acrylic acids such as glycidylmethacrylate and glycidylacrylate; macromonomers such as Styrene Macromonomer 4500 (trade name, manufactured by Sartomer Company) and NK Ester M-230G (trade name, manufactured by Shin-Nakamura Chemical Co., Ltd.); 2-(meth)acryloyloxyethylsuccinic acid, 2-acrylamide-2-methylpropanesulfonic acid, partially sulfonated styrene, mono(acryloyloxyethyl)acid phosphate and mono(methacryloyloxyethyl)acid phosphate.

Among these non-fluorine and non-silicone type monomers having an ethylenic double bond, (meth)acrylate monomers having a polyoxyalkylene group at the side chain including mono(meth)acrylates or di(meth)acrylates of polyalkylene glycol such as polyethylene glycol, polypropylene glycol or a copolymer of an ethylene oxide and propylene oxide, the glycols having a polymerization degree of 1 to 100; and (meth)acrylate monomers with an alkyl group having 6 or more carbon atoms such as (meth)acrylates with an alkyl group having 6 or more carbon atoms are preferable.

No particular limitation is imposed on the method of producing a fluorine type polymer, the method involving a process of polymerizing the monomer (A) containing a fluorinated alkyl group and an ethylenic double bond, with the monomer (B) containing a silicone chain and an ethylenic double bond and, further, as necessary, a non-fluorine and non-silicone type monomer having an ethylenic double bond, and the polymer may be produced by, for example, the solution polymerization method, block polymerization method or emulsion polymerization method based on the polymerization mechanism of, for example, the radical polymerization method, cation polymerization method and anion polymerization method. Among these methods, the radical polymerization method is simple and is therefore industrially desirable.

In this case, as the polymerization initiator, known ones may be used. Examples of the polymerization initiator include peroxides such as benzoyl peroxide and diacyl peroxide, azo compounds such as azobisisobutyronitrile and phenylazotriphenylmethane and metal chelate compounds such as manganese triacetonate. Also, in the polymerization reaction, a chain transfer agent, for example, thiol compounds having a coupling group such as lauryl mercaptan, 2-mercaptoethanol, ethylthioglycolic acid, octylthioglycolic acid and γ-mercaptopropyltrimethoxysilane may be used in combination with the polymerization initiator as necessary.

Also, a fluorine type random or block copolymer according to the present invention may be obtained by photopolymerization or polymerization using radial rays or heat as the energy source in the presence of a photosensitizer and photoinitiator.

The polymerization is preferably undergone in the presence of a solvent from the viewpoint of workability though it can be undergone in the presence of no solvent. Examples of the solvent include alcohols such as ethanol, isopropyl alcohol, n-butanol, iso-butanol and tert-butanol; ketones such as acetone, methyl ethyl ketone and methyl isobutyl ketone; esters such as methyl acetate, ethyl acetate and butyl acetate; polar solvents such as dimethylformamide and dimethyl sulfoxide; halogen type solvents such as 1,1,1-trichloroethane and chloroform; ethers such as tetrahydrofuran and dioxane; aromatics such as benzene, toluene and xylene; and fluorinated inert liquids such as perfluorooctane and perfluorotri-n-butylamine.

The copolymerization ratio by weight of the monomer (A) containing a fluorinated alkyl group and an ethylenic double bond to the monomer (B) containing a silicone chain and an ethylenic double bond is preferably in a range from 100:1 to 1:100 and more preferably in a range from 40:1 to 1:40. Also, in the case of introducing the non-fluorine and non-silicone type monomer having an ethylenic double bond into the monomer (A) containing a fluorinated alkyl group and an ethylenic double bond and the monomer (B) containing a silicone chain and an ethylenic double bond, the ratio by weight of the non-fluorine and non-silicone type monomer to the total weight of the monomer (A) containing a fluorinated alkyl group and an ethylenic double bond and the monomer (B) containing a silicone chain and an ethylenic double bond is preferably 1,000 or less and more preferably 100 or less.

The molecular weight of the fluorine type polymer to be used in the present invention is preferably in a range from 1,000 to 2,000,000 and more preferably in a range from 1,000 to 500,000 in terms of number average molecular weight (Mn).

As commercially available products of the fluorine type surfactant, Megafac R-08 MH, Megafac F482, Megafac F470, Megafac F471, Megafac F472SF, HAS-36 (manufactured by Dainippon Ink and Chemicals, Ltd.) and the like are preferably used.

Also, the content of the fluorine type surfactant is preferably 0.0001 to 1% by weight, more preferably 0.0001 to 0.6% by weight and even more preferably 0.001 to 0.3% by weight based on all solid from the point of preventing the edge of the film from generating a thick film part. When the content of the fluorine type surfactant is less than 0.0001% by weight, no adequate effect may be produced and there is therefore a fear as to the generation of a thick film at the edge, whereas when the content of the fluorine type surfactant exceeds 1% by weight, there is a fear that the edge of the coating film becomes so low that white voids of the edge of a pixel are generated, and also, there is a fear as to a deterioration in recoat characteristics. Also, the content of the fluorine type surfactant is expressed as the content of the solid of the fluorine type surfactant. The recoat characteristics in the present invention mean such a nature that when a layer forming coating solution such as an overcoat layer is applied to a coating film formed using the ink-jet ink according to the present invention, the coating solution is uniformly applied without any cissing. The description "deterioration in recoat characteristics" means that when a layer forming coating solution such as an overcoat layer is applied to a coating film formed using the ink-jet ink according to the present invention, a cissing phenomenon occurs, and specifically means the condition that a film of a coating solution for forming a layer such as an overcoat layer is thinly and ununiformly formed on the peripheries of fine projections formed as cores.

(Silicone Type Surfactant)

In the present invention, a silicone type surfactant containing a polyether and/or polyester-modified polydimethylsiloxane structure may be contained in an amount of 0.001 to 2.5% by weight based on all solid. This is because the silicone type surfactant also has the effect of preventing the edge of the film from generating a thick film part. In this case, when the silicone type surfactant exceeds 2.5% by weight based on all solid, there is the case where a deterioration in electric characteristics and recoat characteristics is caused.

The silicone type surfactant is preferably one having a phenyl group among the surfactants above in view of the effect of preventing the edge of the film from generating a thick film part. Also, the weight average molecular weight of the silicone type surfactant is preferably 500 to 10000 and more preferably 1000 to 3000.

As commercially available products of the silicone type surfactant, BYK-307, BYK-300, BYK-302, BYK-306, BYK-330, BYK-331, BYK-344 and BYK-silclean 3700 (tradename, manufactured by Bigchemie Japan) and KP-321 and KP-324 (trade name, manufactured by Shin-Etsu Silicone Co., Ltd.) are preferably used.

The content of the silicone type surfactant is preferably 0.001 to 2.5% by weight, more preferably 0.001 to 1.25% by weight and even more preferably 0.01 to 0.75% by weight based on all solid from the viewpoint of preventing the edge of the film from generating a thick film part. When the content of the silicone type surfactant is less than 0.001% by weight, no adequate effect may be produced and there is a fear as to the occurrence of a thick edge part, whereas when the content of the silicone type surfactant exceeds 2.5% by weight, there is a fear that the edge of the coating film becomes so low that white voids of the edge of a pixel are generated, there is a fear that the volume resistance is increased, thus causing the problem concerning electric characteristics and also, there is a fear as to a deterioration in recoat characteristics. Also, the content of the silicone type surfactant is expressed as the solid content of the silicone type surfactant.

(Vinyl Ether Type Surfactant)

The ink-jet ink used in the present invention may contain a vinyl ether type surfactant. Here, the vinyl ether type surfactant means a surfactant constituted of a polymer obtained using a vinyl ether monomer.

The vinyl ether monomer used in the vinyl ether type surfactant is preferably an alkyl vinyl ether represented by the formula (5).

[Formula 29]

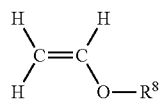

(5)

$R^8$ in the formula represents a straight-chain or branched hydrocarbon having 1 to 8 carbon atoms.

$R^8$ in the formula (5) is a straight-chain or branched hydrocarbon having 1 to 8 carbon atoms. $R^8$ is preferably a straight-chain or branched hydrocarbon having 3 to 4 and more preferably 4 carbon atoms. When the number of carbons exceeds 8, there is a fear that the solubility of the polymer decreases. Examples of the alkyl vinyl ether include methyl vinyl ether, ethyl vinyl ether, n-propyl vinyl ether, isopropyl vinyl ether, n-butyl vinyl ether, isobutyl vinyl ether, t-butyl vinyl ether, pentyl vinyl ether, hexyl vinyl ether and 2-ethylhexyl vinyl ether. Particularly, a vinyl ether type surfactant using isobutyl ether among these ethers as the vinyl ether monomer is preferable from the viewpoint of preventing the edge of the film from generating a thick film part.

For the vinyl ether type surfactant, the vinyl ether monomer and other monomer may be used to copolymerize. Examples of the copolymerizable monomer include nitrogen-containing vinyl ethers such as diethylaminoethyl vinyl ether, dimethylaminoethyl vinyl ether and morpholine ethylvinyl ether; vinyl esters such as vinyl acetate; allyl ethers such as allyl phenyl ether; allyl esters such as allyl acetate; maleimides such as N-phenylmaleimide and N-cyclohexylmaleimide; fumarates such as diisopropyl fumarate and dicylohexyl fumarate; maleic acid anhydride; and itaconic acid anhydride. As the polymerization method, polymerization methods such as radical polymerization and ion polymerization may be adopted. The alkyl vinyl ether represented by the formula (5) is contained in an amount of, preferably, 70 to 100% by weight and more preferably 80 to 100% by weight in all monomers to be copolymerized. When the amount of the alkyl vinyl ether is less than 70 parts by weight, no adequate effect may be produced and there is a fear that the edge part is thickened.

The weight average molecular weight of the vinyl ether type surfactant is preferably 1,000 to 10,000 and more preferably 1,500 to 5,000 from the point of preventing the edge of the film from generating a thick film part. The weight average molecular weight in the present invention is a calibrated value based on polystyrene in GPC measurement.

Moreover, the SP value of the vinyl ether type surfactant is preferably 8 to 9 and more preferably 8 to 8.5 from the point of preventing the edge of the film from generating a thick film part. The reason is inferred as follows. Specifically, in the case of the ink-jet ink for color filter according to the present invention, a carboxyl group is hidden as a latent group and therefore, the ink is highly soluble in the vinyl ether type surfactant. Moreover, the ink is deblocked when heated and therefore the vinyl ether type surfactant is mutually unsolved in the binder forming system but easily concentrated on the vicinity of the surface, so that the surfactant is diffused on the entire surface of the coating film, to thereby control the entire surface of the coating film to an adequate level, whereby the drying from the surface of the coating film is easily uniformed.

In the case of, for example, a polyvinyl isobutyl ether, the SP value is 8.35 and in the case of a polyvinyl isobutyl ether, the SP value is 8.31.

Also, the content of the vinyl ether surfactant is preferably 0.05 to 1.25% by weight and more preferably 0.10 to 1.00% by weight on all solid from the viewpoint of preventing the edge of the film from generating a thick film part. When the content of the vinyl ether type surfactant is less than 0.05% by weight, no adequate effect may be produced and there is a fear that the edge part is thickened, whereas when the content of the vinyl ether type surfactant exceeds 1.25% by weight, there is a fear that the edge of the coating film becomes so low that white voids of the edge of a pixel are generated, there is a fear that the volume resistance is increased, thus causing the problem concerning electric characteristics and also, there is a fear as to a deterioration in recoat characteristics. The content of the vinyl ether type surfactant is expressed as the solid content of the vinyl ether type surfactant.

As commercially available products of the vinyl ether type surfactant, LHP-90 (trade name, manufactured by Kusumoto Chemicals, Ltd.) and the like are preferably used.

Besides the above surfactants, for example, fatty acid ester type surfactants and specific acryl type polymers may be used.

(Other Components)

The ink-jet ink for color filter which is used in the present invention can be further compounded with one or two or more other additives as necessary. Examples of these additives may include the following materials.

a) Fillers: for example, glass and alumina.
b) Adhesion promoters: for example, vinyltrimethoxysilane, vinyltriethoxysilane, vinyltris(2-methoxyethoxy) silane and N-(2-aminoethyl)-3-aminopropylmethyldimethoxysilane.
c) Ultraviolet absorbing agents: for example, 2-(3-t-butyl-5-methyl-2-hydroxyphenyl)-5-chlorobenzotriazole and alkoxybenzophenone.
d) Coagulation preventives; for example, a sodium polyacrylate.

(Method of Producing Ink)

The ink-jet ink used in the present invention may be produced by pouring each component in a solvent which may be a single solvent or a mixture solvent and by mixing these components to dissolve or disperse solid components.

However, when pigments are directly poured in the whole solvent together with other components such as the binder forming system to mix these components with stirring, many of these pigments are insufficiently dispersed in the solvent. Therefore, usually, a solvent superior in the ability of dispersing the pigment and in dispersion stability is prepared and then, the pigment is dispersed together with a pigment dispersing agent and the mixture is sufficiently stirred by a dissolver to prepare a pigment dispersion solution. Then, the pigment dispersion solution obtained is poured into a solvent almost constituted of a main solvent or solvent only containing a main solvent together with components other than the pigments and the resulting ingredients are sufficiently mixed with stirring to obtain an ink-jet ink according to the present invention.

As to the balanced solvent into which the pigment dispersion solution is poured, a solvent may be used which has the components obtained by excluding the components of the solvent used for the preparation of the pigment dispersion solution from the final components of the whole solvent, and diluted to a final concentration to complete the ink-jet ink. Also, the pigment dispersion solution may be poured into a relatively small amount of the main solvent to prepare an ink-jet ink having a high concentration. The ink-jet ink having a high concentration may be stored as it is, diluted to a final concentration just before it is used and used in the ink jet system.

2. Step (B) of Forming an Ink Layer

Next, an ink layer is formed by making the ink-jet ink prepared in the step (A) selectively adhere on each predetermined area of a transparent substrate by the ink-jet method. Since the ink jet system is used, higher productivity than in the case of using the conventional photolithographic method is obtained and a reduction in cost and an improvement in yield can be attained.

The step (B) for forming an ink layer will be explained with reference to FIGS. 2A to 2F.

Figure 2A:
FIGS. 2A to 2F are views for explaining steps of forming an ink layer and steps of forming a pixel by the ink jet method.

First, a transparent substrate for a color filter is prepared as shown in FIG. 2A.

Though any material may be used for the material of a transparent substrate 5 without any particular limitation as long as it is currently used in color filters, a non-flexible transparent rigid material, for example, quarts glass, Pyrex (registered trademark) glass or synthetic quarts plate, or a flexible material such as a transparent resin film and optical resin plate may be used. Among these materials, particularly, a 7059 glass manufactured by Coning Company is a material having a small coefficient of thermal expansion, is superior in dimensional stability and workability in high-temperature treatment and is also a non-alkali glass containing no alkali component in glass. Therefore, this glass is suitable for a color filter used in a color liquid crystal display device using the active matrix system. Though in the present invention, a transparent substrate is usually used, a reflective substrate or a substrate colored in white may also be used. Also, as the substrate, an appropriate one surface-treated for the purpose of the prevention of elusion of alkali and provision of gas barrier characteristics may be used.

Figure 2B:
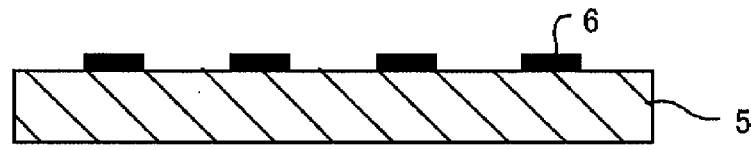

Next, as shown in FIG. 2B, a black matrix layer 6 is formed in the region which is the boundary between pixels on one surface of the transparent substrate 5.

The black matrix layer 6 which is a dividing wall for making ink adhere on a predetermined area is formed between pixels 7R, 7G and 7B and around the outside of the pixel formation region, whereby the contrast of a display image can be improved.

The height of the black matrix layer 6 is preferably 2.0 μm to 3.0 μm and more preferably 2.0 μm to 2.5 μm from the point that a color filter according to the present invention can be easily obtained when it is formed particularly using the ink jet system. When the height of the black matrix layer exceeds 3.0 μm, there is the case where the strength and pattern accuracy are unsatisfactory. Also, the pixels obtained have a form in which the film thickness in the vicinity of the center is greatly dropped, and this form is a particularly large factor giving a hindrance to an improvement in reduced brightness. When the height is less than 2.0 μm, on the other hand, an ink break can easily happen when ink layer is deposited and also, the pixel obtained is made into a form in which the film thickness in the vicinity of the edge of a black matrix is greatly dropped whereas there is a great rise in the center part, thus causing a reduction in brightness.

When a metal thin film is formed as the black matrix layer 6, the thin film is patterned to thereby form the black matrix layer 6. As the patterning method, usual patterning methods such as the sputtering method and vacuum vapor deposition method may be used.

When a layer prepared by compounding light-shielding particles such as carbon microparticles, metal oxide, inorganic pigment and organic pigments in a resin binder as the black matrix layer 6, usually used methods such as the photographic method and printing method may be used as the patterning method. Or, the ink jet system may be used to form the pattern in the same manner as in the case of a pixel 7.

A black matrix layer prepared by compounding light-shielding particles in a resin binder is preferably used from the point that a black matrix layer having the above-mentioned height is formed easily.

Figure 2C:
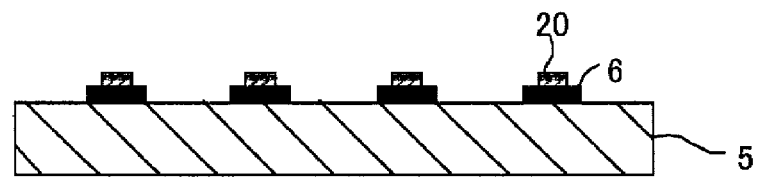

Next, as shown in FIG. 2C, an ink repellent dividing wall 20 narrower than the width of the black matrix layer is formed in the center in the direction of the width of the pattern of the black matrix layer as necessary. There is no particular limitation to the composition of the ink repellent dividing wall insofar as it is a resin composition having ink repellency. Also, it is unnecessary that the ink repellent diving wall is transparent, and the dividing wall may be colored. For example, a material which is to be used in the black matrix layer and contains no black material may be used as the composition of the ink repellent dividing wall. Specific examples of these materials of the ink repellent dividing wall may include compositions prepared by mixing one or two or more aqueous resins such as a polyacrylamide, polyvinyl alcohol, gelatin, casein and cellulose and O/W emulsion type resin compositions, for example, those obtained by emulsifying reactive silicone. A photocurable resin is preferably used in terms of handling and easy curing. Also, this ink repellent dividing wall is more desirable as the ink repellency is higher and therefore, those each obtained by treating its surface with an ink repellent treating agent such as a silicone compound or fluorine-containing compound are preferable.

The patterning of the ink repellent dividing wall may be carried out by printing using a coating solution of an ink repellent resin composition or photolithography using a photocurable coating solution. The ink repellent dividing wall preferably has a certain level of height to prevent ink from being mixed when the ink layer is colored by the ink jet system. Specifically, the height of the dividing wall is preferably in a range from 0.1 μm to 2.0 μm though this differs depending on the deposited amount of the ink to be jetted.

Figure 2D:
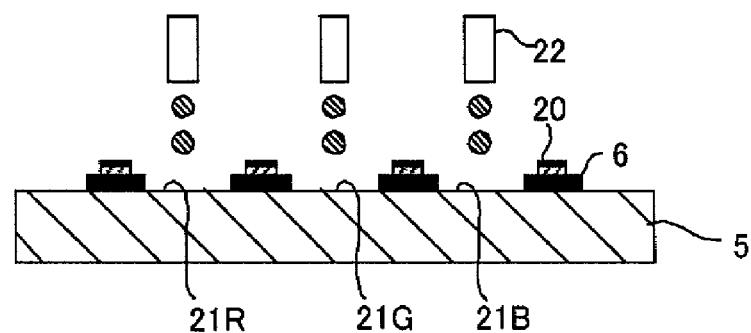

Next, ink-jet inks in which red (R), green (G) and blue (B) pigments are compounded and which are used in the present invention are prepared. Then, as shown in FIG. 2D, ink layers are formed by making corresponding color pixel forming ink-jet inks selectively adhere to color pixel forming regions 21R, 21G and 21B partitioned by the pattern of the black matrix layer 6 on the transparent substrate 5. The ink layers are formed such that a red pattern, green pattern and blue pattern are arranged in a desired form such as a mosaic type, stripe type, triangle type or four-pixel configuration type. In this step of jetting ink, it is necessary for the ink-jet ink to be resistant to an increase in viscosity at the end part of a head 22 to thereby maintain good jetting characteristics. In this case, the ink having a corresponding color can be exactly and uniformly attached to a place within a predetermined pixel forming region, with the result that a pixel part free from color unevenness and color void can be formed with a precise pattern. Also, each color pixel forming ink-jet ink can be simultaneously jetted to the substrate by using plural heads and therefore, working efficiency can be more improved than in the case of forming a pixel part every color by using a method such as printing.

Though the amount of the ink to be attached differs depending on the composition of the ink, the ink is attached to the pixel forming region in the amount necessary to obtain the shape of a pixel as will be explained later.

3. Step (C) of Forming a Pixel

Figure 2E:
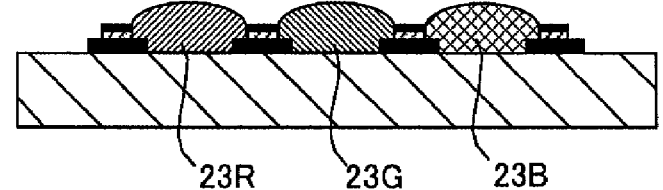

Next, the ink layer in the foregoing step (B) is cured to form a pixel having a shape specific to the present invention. As shown in FIG. 2E, the ink layers 23R, 23G and 23B having each color are dried and as required, prebaked, followed by appropriate exposure and/or heating to cure the ink layer. When the ink layer is appropriately exposed to light and/or heated, the crosslinking elements of the curable resin contained in the ink-jet ink undergoes a crosslinking reaction, whereby the ink layer is cured to form a pixel.

Pixels of a color filter obtained by the present invention are characterized by ununiform thickness in a pixel region because of a restriction to the production method. As mentioned above, the pixel according to the present invention has a form in which it has a low-thickness part along the peripheral edge or its vicinity of the pixel and a maximum-thickness part in a place closer to the center side of the pixel than the low-thickness part, a form in which, on the contrary, it has a high-thickness part along the peripheral edge or its vicinity of the pixel and a minimum-thickness part in a place closer to the center side of the pixel than the high-thickness part, or a form in which its surface has additional concave-convex surface. Here, the peripheral edge means the edge part that defines the plane shape of the pixel. Also, the description "along the peripheral edge or its vicinity of the pixel" implies that it is only required for the pixel to have a low-thickness part along at least a part of the peripheral edge or its periphery. Also, the thickness of the pixel means a height from the standard plane (plane having a mean height) of the substrate. The following explanations focus on the case where the pixel has a low-thickness part along the peripheral edge or its vicinity of the pixel and a maximum-thickness part in a place closer to the center side of the pixel than the low-thickness part.

Figure 3A:
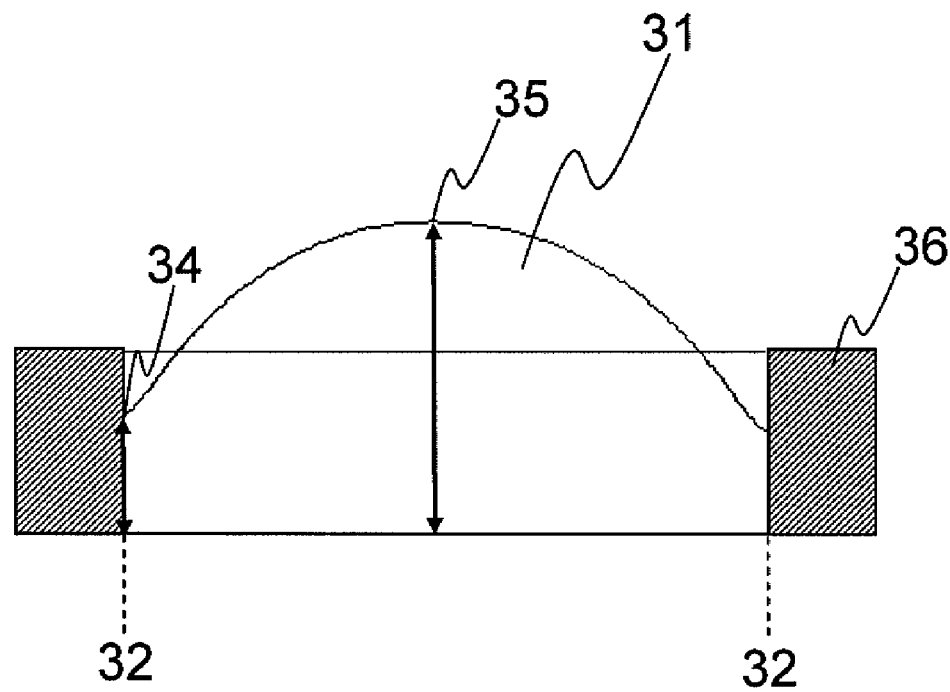
FIGS. 3A and 3B are views for explaining a method of producing a color filter by using an ink-jet ink according to the present invention.
Figure 3B:
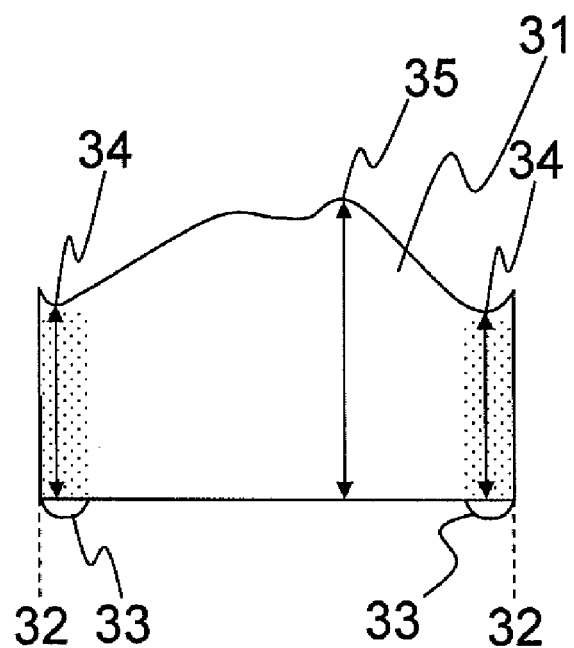

FIGS. 3A and 3B show sectional views along a direction perpendicular to the transparent substrate for explaining an example of a pixel of a color filter according to the present invention. In FIGS. 3A and 3B, a pixel 31 has such a shape having a low-thickness part 34 at the peripheral edge 32 or its vicinity 33 and a maximum-thickness part 35 in a place closer to the center side of the pixel than the low-thickness part 34.

A pixel having ununiform thickness such as the pixel having a sectional shape in which there is a rise in the vicinity of the center is obtained when it is produced by, for example, the ink jet system. When the ink jet system is used, this system has such a merit that a pixel is formed with high accuracy and also, a reduction is cost and an improvement in yield can be attained. The pixel having ununiform thickness such as the pixel having a sectional shape in which there is a rise in the vicinity of the center may be formed by a system other than the ink jet system.

Figure 4A:
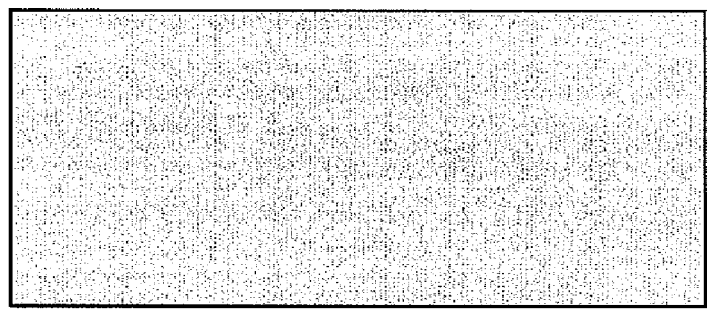
FIGS. 4A and 4B are schematic vertical sectional views showing an example of a pixel in a color filter according to the present invention.
Figure 4B:
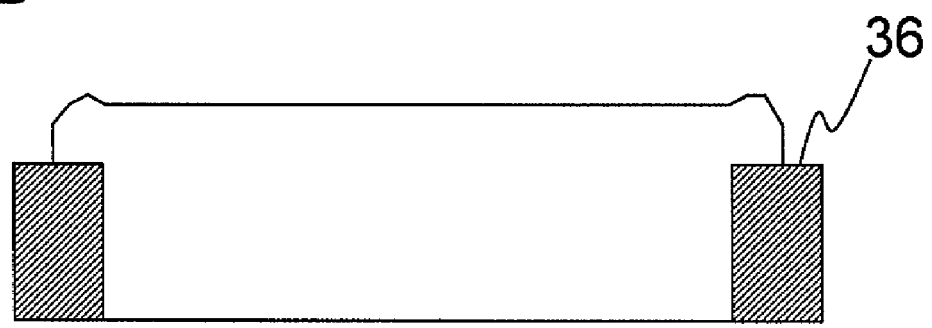

The pixel having a sectional shape in which there is a rise in the vicinity of the center is significantly different in shape from a pixel formed by the spin coating method. The pixel formed by the spin coating method has almost a uniform thickness as shown in FIG. 4A, and when a part differing in thickness is present, there is usually a rise not in the vicinity of the center of the pixel but at a part of the edge of the pixel which part steps onto the black matrix.

In each pixel constituting a color filter obtained in the present invention, the average film thickness is 1.5 μm to 2.5 μm, the distribution of film thickness is in a range from 1.0 μm to 3.0 μm and the ratio of the sum of areas of the regions where the film thickness is 1.5 μm or less and 2.5 μm or more in one pixel is 5% or less. Though in a color filter having such a pixel, the shape of a pixel is ununiform, the color filter has such an advantage that it has an average film thickness enough to obtain sufficient color characteristics and has the characteristics that it is more reduced in the loss of brightness than and the same or almost the same color characteristics as a color filter having a pixel obtained by the spin coating method enabling uniform film thickness to be obtained.

The average film thickness of the pixel, the distribution of film thickness, and the ratio of the sum of areas of the regions where the film thickness is 1.5 μm or less and 2.5 μm or more in one pixel may be measured, for example, by a light interference three-dimensional non-contact surface shape measuring instrument (trade name: Micromap 557N, manufactured by Micromap, US). The average film thickness (μm) of the pixel is found by measuring film thicknesses every 1 μm on all area of the pixel forming region to calculate an average of these measured thicknesses. Also, the distribution (μm) of film thickness of the pixel means the distribution of film thickness in the pixel forming region. The flatness of the pixel tends to be deteriorated as the distribution of film thickness is widened. Also, with increase in the ratio of the sum of areas of the regions where the film thickness is 1.5 μm or less and 2.5 μm or more in one pixel, the flatness is lower.

Here, the ratio of the sum of areas of the regions where the film thickness is 1.5 μm or less or 2.5 μm or more in one pixel is defined by the following equation.

$$R(\%) = (n_1 + n_2)/n_0 \times 100$$

wherein R represents the ratio (%) of the sum of areas of the regions where the film thickness is 1.5 μm or less and 2.5 μm or more in one pixel, $n_1$ denotes the number of measured points where the film thickness is 1.5 μm or less, $n_2$ denotes the number of measured points where the film thickness is 2.5 μm or more and $n_0$ denotes the number of measured points in all area of the pixel forming region.

The average film thickness of the pixel obtained in the present invention is 1.5 μm to 2.5 μm. When the average film thickness of the pixel is in the range above, the color filter obtained has the same or almost the same color characteristics as a color filter having a pixel which is produced by the spin coating method and has an average film thickness enough to obtain sufficient color characteristics.

The G-pixel is usually more deteriorated in the tinting strength of a pigment to be used than the R-pixel and B-pixel, it is necessary to take a display balance with other pixels by increasing the P/V ratio or the average film thickness. However, if the P/V ratio is too high, the solvent resistance of the pixel is deteriorated. From this point of view, the average film thickness of the G-pixel is 1.6 μm or more and preferably 1.8 μm or more. For this reason, in order to eliminate a difference in film thickness between R, G and B, it is necessary that the average film thickness of each of R, G and B be 1.5 μm or more.

When a pixel having an average film thickness of 2.5 μm or more by the ink jet system on the other hand, the height of the black matrix layer is limited as mentioned above, and there is therefore the possibility that the ink brak phenomenon occurs from the reason that the amount of the ink to be jetted in the step of forming the ink layer is too large for the height of the black matrix layer, thus causing color mixing of a pixel to be obtained. Therefore, it is necessary that the average film thickness of the pixel is 2.5 μm or less and preferably 2.2 μm or less.

If the average film thickness of the pixel is in the range above, the thickness of a pixel having each color may be changed to design each color pixel having an optimum thickness in such a manner that, for example, the red pixel 7R is most thin, and the blue pixel 7B is higher and the green pixel 7G are more higher in thickness than the red pixel 7R.

Also, the distribution of film thickness of the pixel having the average film thickness above is in a range from 1.0 μm to 3.0 μm. When the distribution of film thickness exceeds 3.0 μm, there is the case where the brightness is reduced in the same manner as above.

Also, as to a pixel having the above average film thickness and distribution of film thickness, the ratio of the sum of the regions where the film thickness of 1.5 μm or less or 2.5 μm or more in one pixel is 5% or less.

Each pixel constituting a color filter obtained in the present invention more preferably has the characteristics that the average film thickness is 1.7 μm to 2.4 μm, the distribution of film thickness is 1.5 μm to 2.5 μm and the ratio of the sum of areas of the regions where the film thickness is 1.5 μm or less and 2.5 μm or more in one pixel is 3% or less.

The pixels of a color filter are usually formed of three colors, that is, red (R), green (G) and blue (B). The color pattern shape of the pixel is arranged in a known form such as a stripe type, mosaic type, triangle type or four-pixel configuration type, and the color area may be designed optionally.

In the present invention, as an index expressing a reduction in brightness primarily caused by the shape of a pixel, brightness loss ΔY (%) is used. This brightness loss ΔY (%) is found from the following equation.

$$\Delta Y(\%) = (Y_2 - Y_1)/Y_2 \times 100$$

wherein $Y_1$ represents the brightness of a color filter which is a subject of measurement and $Y_2$ represents the brightness of a color filter obtained by the spin coating method.

Here, the spin coating method is a method in which an ink-jet ink is applied to a transparent substrate by spin coating and cured to form a pixel.

The brightness loss may be evaluated in the following manner.

Figure 6A:
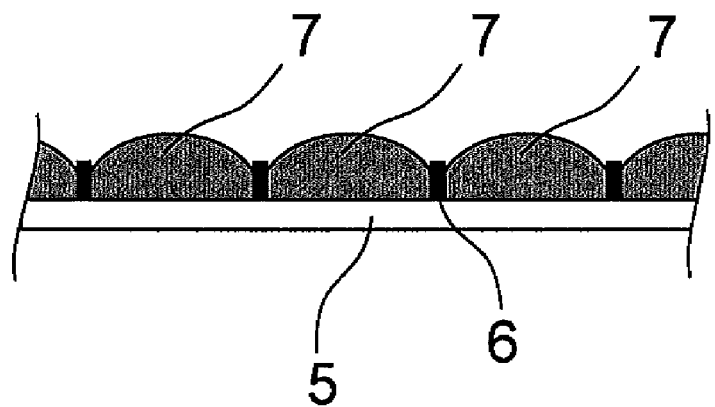
FIGS. 6A and 6B are schematic vertical sectional views showing an example of a color filter for evaluation according to the present invention.
Figure 6B:
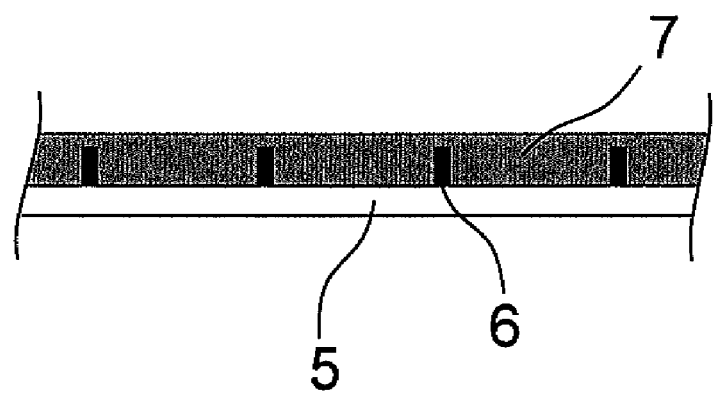

First, a color filter is prepared which is a subject of measurement and is produced by arranging pixels having a desired shape and the same color by the ink jet system as shown by a sectional view of FIG. 6A. Next, a color filter is prepared which has the same chromaticity (x in the case of R and y in the case of G and B are respectively made to be the same) as the color filter which is a subject of measurement, is produced by arranging almost flat pixels as shown in a sectional view of FIG. 6B and is obtained by the spin coating method.

Next, in the pixel region of the prepared color filter, a region having a width of 4 mm and a height of 11 mm is set as the detection area of a sample to measure a spectral transmission spectrum in the visible region by using a wide area spectrometer (trade name: "Shimadzu Automatic Spectrophotometer UV-3100PC", manufactured by Shimadzu Corporation) and, from the results, $Y_1$ and $Y_2$ are calculated and also, the brightness loss $\Delta Y$ is found based on the equation (1).

The color filter obtained in the present invention preferably fulfills the equation: $\Delta Y (\%) \geq 5$. When the brightness loss is in the above-mentioned range, the color filter has an average film thickness enough to obtain sufficient color characteristics and is comparable to a color filter having an almost flat pixel obtained by photolithography in brightness.

The microscopic spectral measurement usually used as the method for measuring the brightness of a color filter cannot be used to measure the brightness in the present invention because when the brightness of a pixel having an ununiform thickness which is specific to an ink jet color filter is evaluated, the results of evaluation are different from the results of the evaluation of the brightness of the color filter installed in the panel which is an actual form of use.

Figure 2F:
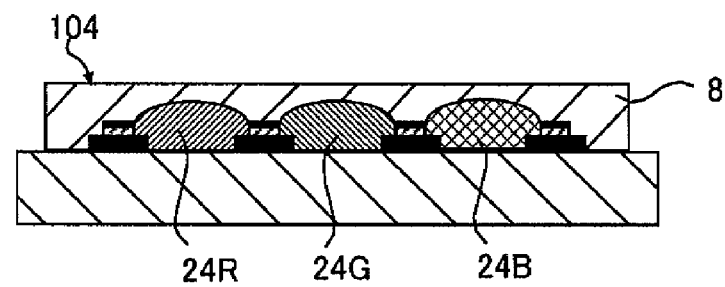

Next, as shown in FIG. 2F, a protective film 8 is formed on the side of the transparent substrate on which side the pixels 24R, 24G and 24B are formed.

The protective film 8 is formed to flatten the surface of the color filter and to prevent components contained in the pixel 7 from being eluted into the liquid crystal layer. The protective film 8 may be formed by applying a known negative-type photocurable transparent resin composition or heatcurable transparent resin composition by a method such as spin coating, roll coating, spray or printing in such manner as to cover the black matrix layer 6 and the pixel 7 and by curing the resin composition by light or heat.

The thickness of the protective film 8 may be designed in consideration of, for example, the light transmittance of the material to be used and the surface condition of the color filter, and may be set, for example, in a range from 0.1 μm to 2.0 μm.

As to other conditions, the same method that is usually used to form a color filter may be used to produce the color filter.

4. Color Filter

The color filter according to the present invention includes, at least, a transparent substrate and a pixel which is formed on the transparent substrate and contains a pigment, a pigment dispersing agent and a binder, the average film thickness is 1.5 μm to 2.5 μm, the distribution of film thickness is in a range from 1.0 μm to 3.0 μm and the ratio of the sum of areas of the regions where the film thickness is 1.5 μm or less and 2.5 μm or more in one pixel is 5% or less. Even in the case of using a formation method, such as the ink jet system, such a color filter tends to form a pixel having an ununiform shape because of a technical restriction, such a color filter exhibits the same or almost the same brightness as a color filter having a pixel with the same average film thickness, the same structural ratio of materials and a flat shape.

As to the method of forming a color filter according to the present invention, besides the ink jet method, known methods such as the dying method, printing method and electrodeposition method may be used.

Figure 5:
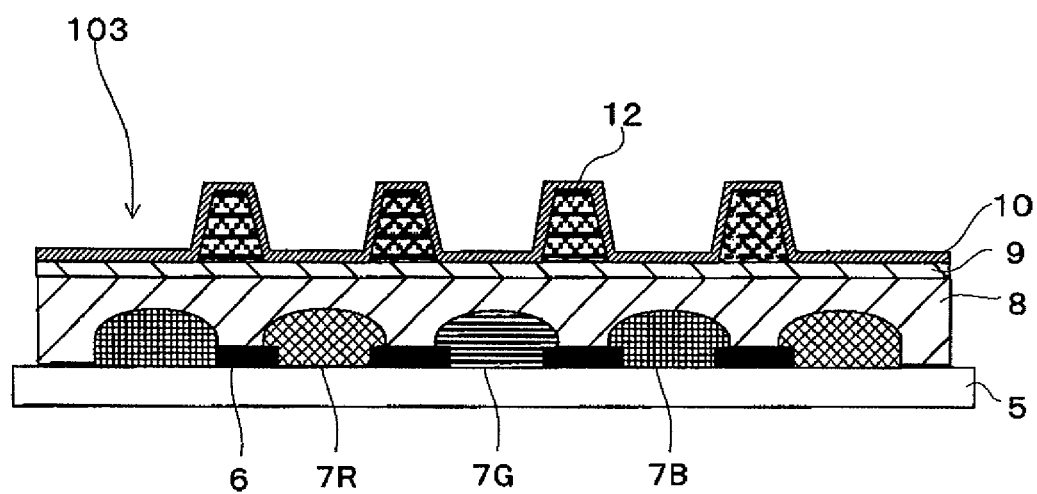
FIG. 5 is a schematic vertical sectional view showing an example of a color filter according to the present invention.

FIG. 5 is a vertical sectional view showing an example (color filter 103) of a color filter according to the present invention. This color filter 103 has a black matrix 6 formed on a transparent substrate 5 with a predetermined pattern, a pixel 7 (7R, 7G, 7B) formed on the black matrix with a predetermined pattern and a protective film 8 formed in such a manner as to cover the pixel. Also, a transparent electrode film 9 for driving a liquid crystal is formed on the protective film 8. An orientation film 10 is formed on the innermost surface of the color filter 103 and specifically, on the transparent electrode film 9 in this case.

The columnar spacer 12 is one form of the convex spacer and is formed on plural positions (four positions in FIG. 5) on the transparent electrode 9 in accordance with the region (non-display region) on which the black matrix layer 6 is formed. The columnar spacer 12 is formed on the transparent electrode 9, on the pixel 7 or on the protective film 8. Although, in the color filter 102, the columnar spacer is formed in the form of an island on the protective film 8 with the transparent electrode film being interposed therebetween, the protective film 8 and the columnar spacer 12 may be formed in an integrated manner and the transparent electrode film 9 may be formed so as to cover the integrated one. Also, when the color filter does not have the black matrix layer, the columnar spacer may be formed in the region where no pixel is formed.

Each structural member will be explained.

(Transparent Substrate)

The transparent substrate constituting the color filter of the present invention is the same as that explained in the production method.

(Pixel)

The pixel constituting the color filter of the present invention preferably contains a pigment, a pigment dispersing agent and a binder and as required, a leveling agent.

The binder contains a reaction product of a reactive component in the case of the reactive component or non-reactive component in the case of the non-reactive component in the step of curing the ink layer among the structural components of the binder forming system explained in the binder forming system.

The details are the same as those explained in the production method.

(Black Matrix Layer)

Though the black matrix layer is formed to improve the contrast of a display image, it doubles as a dividing wall that divides individual pixels in the case of producing a color filter by the ink-jet method.

When the black matrix layer is formed, its height is preferably 2.0 μm to 3.0 μm and more preferably 2.0 μm to 2.5 μm from the point of easily obtaining a color filter according to the present invention, especially, in the case of producing a color filter by the ink-jet method. The details of the black matrix layer are the same as those explained in the production method.

(Protective Film)

The protective film is the same as that explained in the production method.

(Spacer)

The convex spacer is formed in plural in the non-display region on the substrate to keep a cell gap when applying the color filter 103 to a liquid crystal driving side substrate such as a TFT array substrate. No particular limitation is imposed on the shape and dimension of the convex spacer insofar as the convex spacer can be selectively formed in the non-display region on the substrate and a specified cell gap can be kept over the entire substrate. When a columnar spacer 12 as shown in the drawing is formed as the convex spacer, the columnar spacer 12 has a fixed height ranging from about 2 μm to 10 μm and its projected height (thickness of the pattern) may be properly designed based on the thickness required for the liquid crystal layer. Also, the thickness of the columnar spacer 12 may be designed properly in a range from about 5 μm to 20 μm. Also, the formation density (crowding) of the columnar spacer 12 may be appropriately designed in consideration of nonuniformity of the thickness of the liquid crystal layer, numerical aperture and the shape and material of the columnar spacer. For example, the columnar spacer develops a necessary and sufficient spacer function even in a ratio of one spacer to one group of red, green and blue pixels. It is only required for the shape of the columnar spacer to be columnar and for example, a cylindrical shape, prism shape and beheaded-cone shape may be adopted.

The convex spacer is formed as follows. Specifically, a coating solution of a curable resin composition is applied to a transparent substrate directly or through other layers such as a transparent electrode by a method such as spin coater, roll coater, spraying or printing and dried to form a curable resin layer. The number of rotations of the spin coater may be set within a range from 500 to 1500 rpm in the same manner as in the case of forming the protective layer. Usually, as the ink-jet ink used to form a spacer, a photocurable ink-jet ink is preferably used. Therefore, then, this resin layer is exposed to light through a photomask for the convex spacer and developed by a developing solution such as an alkali solution to form a specified convex pattern, which is then heat-treated (post-bake) as necessary in an clean oven or the like to form a convex spacer.

The convex spacer may be formed on the color filter directly or indirectly through other layers. For example, a transparent electrode such as ITO or a protective film may be formed on the color filter and the convex spacer may be formed on the transparent electrode or a protective layer and a transparent electrode may be formed in this order on the color filter and the convex spacer may be formed on the transparent electrode.

(Transparent Electrode)

The transparent electrode 9 may be formed using indium tin oxide (ITO), zinc oxide (ZnO) or the like and alloys of these materials. The thickness of the transparent electrode is about 20 to 500 nm and preferably about 100 to 300 nm.

(Other Layers)

The color filter may contain other members which are usually used for color filters. The orientation film and other members may be formed using materials which are used for color filters by a usual method.

EXAMPLES

The present invention will be explained in more detail by way of examples, which are not intended to be limiting of the present invention. In these examples, the parts represent parts by weight unless otherwise noted.

Production Example 1

Synthesis of a Binder Type Epoxy Compound

A four-neck flask equipped with a temperature gauge, a reflux condenser, a stirrer and a dropping funnel was charged with 40.7 parts by weight of diethylene glycol monobutyl ether acetate (another name: butylcarbitol acetate, hereinafter referred to as BCA as the case may be) which was a solvent containing no hydroxyl group according to the formulations shown in Table 1, which was then heated with stirring to 140° C. Then, 54.7 parts by weight of a mixture (dripped component) of a monomer having a composition described in Table 1 and a polymerization initiator was added dropwise from the dropping funnel for 2 hours. After the addition was completed, the mixture was cooled to 110° C. and 4.6 parts by weight of a mixture (addition catalyst component) of a polymerization initiator and diethylene glycol monobutyl ether acetate (BCA) which was a solvent containing no hydroxyl group. When the mixture was kept at 110° C. for 2 hours, the reaction was stopped to thereby obtain a binder type epoxy compound having the characteristics described in Table 1.

[Table 1]

TABLE 1

| Production Example | | |
|---|---|---|
| Initial charged solvent (parts by weight) | Diethylene glycol monobutyl ether acetate (BCA) | 40.7 |
| Dripped component*[1] (parts by weight) | GMA | 10 |
|  | MMA | 40 |
|  | Perbutyl O | 4.7 |
| Addition catalyst component (parts by weight) | Perbutyl O | 0.30 |
|  | Diethylene glycol monobutyl ether acetate (BCA) | 4.3 |
| Characteristics | Weight average molecular weight*[2] | 20000 |

*[1]The abbreviations in the table are as follows.
GMA: Glycidyl methacrylate
MMA: Methylmethacrylate
Perbutyl O: t-butylperoxy2-ethylhexanoate (trade name, manufactured by Nippon Oil & Fats Co., Ltd.)
*[2]Weight average molecular weight: a calibrated value based on polystyrene, measured by gel permeation chromatography Example 1

(1) Preparation of a Red Pigment Dispersion Solution

A pigment, a pigment dispersing agent and an organic solvent were mixed in the following ratio and 500 parts by weight of zirconia beads having a diameter of 0.3 mm was added to the mixture, which was then dispersed by using a paint shaker (Asada Iron Works. Co., Ltd.) for 4 hours to prepare a PR254 (C.I. Pigment Red 254) pigment dispersion solution and a PR177 (C.I. Pigment Red 177) pigment dispersion solution respectively.

(Composition of the Pigment Dispersion Solution)
Pigment: 10 parts by weight
Pigment dispersing agent (Ajisper Pb821 (manufactured by Ajinomoto Fine-Techno Co., Inc.) (solid content: 30% by weight in an organic solvent): 20 parts by weight
BCA (diethylene glycol monobutyl ether acetate): 50 parts by weight In this case, the glass transition temperature of the pigment dispersing agent Ajisper Pb821 was measured using a thermochemical reaction calorimeter (manufactured by Seiko Instruments Inc.) in the following condition: temperature range: 25 to 280° C. and temperature rise rate: 7.5° C./min., to find that the glass transition temperature was 57° C.

(2) Preparation of a Binder

A rotator coated with Teflon (registered trademark) was placed in a sample bottle, which was set to a magnetic stirrer. In this sample bottle, the binder type epoxy compound described in the Production Example 1, a polyfunctional epoxy resin and the like were added according to the following ratio and the mixture was stirred thoroughly to dissolve. Then, a dilution solvent was added to adjust the viscosity of the solution and stirred to dissolve and the resulting mixture was subjected to filtration to obtain a binder composition.
(Composition of the Binder)
Binder type epoxy compound (solid content: 30% by weight in the solvent BCA): 10 parts by weight
Polyfunctional epoxy resin (trade name: Epikote 154, manufactured by Japan Epoxy Resins Co., Ltd.): 2 parts by weight
Neopentyl glycol glycidyl ether: 1 part by weight
Trimellitic acid: 2 parts by weight
BCA (diethylene glycol monobutyl ether acetate: 1 part by weight (3) Preparation of an Ink-Jet Ink The PR254 pigment dispersion solution, PR177 pigment dispersion solution and binder composition prepared above were thoroughly mixed to prepare an ink-jet ink.

(4) Formation of a Coating Film (a) Formation of a Coating Film by the Spin Coating Method
A black matrix pattern having a line width of 20 μm and a film thickness of 2.2 μm was formed on a 10 cm×10 cm glass substrate (manufactured by Asahi Glass Co., Ltd.) 0.7 mm in thickness by using a curable resin composition for black matrix according to the photolithographic method.
The ink-jet ink was applied to the entire surface of the black matrix pattern by the spin coating method to form a red coating film which coincides with "x" of the color plate substrate manufactured by the ink jet.
The thickness of the film formed by the spin coating method was measured by a contact type film thickness measuring device (trade name: "Dectak-3030ST", manufactured by Ulvac Inc.).
(b) Formation of a Coating Film by the Ink Jet Method
A black matrix pattern having a line width of 20 μm and a film thickness of 2.2 μm was formed on a 10 cm×10 cm glass substrate 0.7 mm in thickness by using a curable resin composition for black matrix according to the photolithographic method.
The ink-jet ink was attached to the image formation parts partitioned by the black matrix on the substrate by the ink jet system.
After that, the substrate on which the ink was attached was dried at a pressure reduced to 10 Torr for 120 seconds and further pre-baked at 80° C. on a hot plate for 10 minutes. Thereafter, the substrate was post-baked under heating at 200° C. for 30 minutes in a clean oven and further post-baked under heating at 240° C. for 30 minutes, to form a pixel pattern on the substrate. As to the coating film obtained by the ink jet method and after dried, its average film thickness, distribution of film thickness, and the ratio of the sum of areas of the regions where the film thickness was 1.5 μm or less and 2.5 μm or more were measured by a light interference three-dimensional non-contact surface shape measuring instrument (trade name: Micromap 557N, manufactured by Micromap, US).

Example 2

(1) Preparation of a Green Pigment Dispersion Solution

A pigment, a pigment dispersing agent and an organic solvent were mixed in the following ratio and 500 parts by weight of zirconia beads having a diameter of 0.3 mm was added to the mixture, which was then dispersed by using a paint shaker (manufactured by Asada Iron Works. Co., Ltd.) for 4 hours to prepare a PG36 (C.I. Pigment Green 36) pigment dispersion solution and a PY150 (C.I. Pigment Yellow 150) pigment dispersion solution respectively.
(Composition of the Pigment Dispersion Solution)
Pigment: 10 parts by weight
Pigment dispersing agent (Ajisper Pb821 (manufactured by Ajinomoto Fine-Techno Co., Inc.) (solid content: 30% by weight in an organic solvent): 20 parts by weight
BCA (diethylene glycol monobutyl ether acetate): 50 parts by weight (2) Preparation of a Binder A binder composition was prepared in the same manner as in Example 1.

(3) Preparation of an Ink-Jet Ink

The PG36 pigment dispersion solution, PY150 pigment dispersion solution and binder composition prepared above were thoroughly mixed in the compounding ratio shown in Table 2 to prepare an ink-jet ink.

(4) Formation of a Coating Film

The formation of a coating film by using the spin coating method and the formation of a coating film by using the ink jet method were carried out in the same manner as in Example 1.

Example 3

(1) Preparation of a Blue Pigment Dispersion Solution

A pigment, a pigment dispersing agent and an organic solvent were mixed in the following ratio and 500 parts by weight of zirconia beads having a diameter of 0.3 mm was added to the mixture, which was then dispersed by using a paint shaker (manufactured by Asada Iron Works. Co., Ltd.) for 4 hours to prepare a PB 15:6 (C.I. Pigment Blue 15:6) pigment dispersion solution and a PV23 (C.I. Pigment Violet 23) pigment dispersion solution respectively.
(Composition of the Pigment Dispersion Solution)
Pigment: 10 parts by weight
Pigment dispersing agent (trade name: Solsperse 33000 (manufactured by Avecia Company) (solid content: 30% by weight in an organic solvent): 20 parts by weight
BCA (diethylene glycolmonobutyl ether acetate): 50 parts by weight
The pigment dispersing agent Solsperse 33000 is liquid at 23° C.

(2) Preparation of a Binder

A binder composition was prepared in the same manner as in Example 1.

(3) Preparation of an Ink-Jet Ink

The PB15:6 pigment dispersion solution, PV23 pigment dispersion solution and binder composition prepared above were thoroughly mixed in the compounding ratio shown in Table 2 to prepare an ink-jet ink.

(4) Formation of a Coating Film

The formation of a coating film by using the spin coating method and the formation of a coating film by using the ink jet method were carried out in the same manner as in Example 1.

Example 4

The formation of a coating film by using the spin coating method and the formation of a coating film by using the ink jet method were carried out in the same manner as in Example 1 except that in the process "(3) Preparation of an ink-jet ink", the PR254 pigment dispersion solution, PR177 pigment dispersion solution and binder composition prepared above were thoroughly mixed in the compounding ratio shown in Table 2, and then, a vinyl ether type surfactant (trade name: "LHP-90", manufactured by Kusumoto Chemicals, Ltd.) was added as a leveling agent to the mixture in an amount of 0.5% by weight based on the total weight of the PR254 pigment dispersion solution, PR177 pigment dispersion solution and binder composition prepared above, followed by mixing.

Comparative Examples 1 to 12

(1) Preparation of a Red Pigment Dispersion Solution

In Comparative Examples 1 to 6, red pigment dispersion solutions were prepared in the same manner as in Example 1. In Comparative Example 7, a red pigment dispersion solution was prepared in the same manner as in Example 1 except that Disperbyk161 (manufactured by BYK Japan KK) (solid content: 30% by weight in an organic solvent)) having a principal chain structure obtained by polymerizing isocyanates as the pigment dispersing agent. In Comparative Example 8, a red pigment dispersion solution was prepared in the same manner as in Example 1 except that Disperbyk2000 (manufactured by BYK Japan KK) (solid content: 30% by weight in an organic solvent)) which was a modified acryl type block copolymer as the pigment dispersing agent. In Comparative Example 9, a red pigment dispersion solution was prepared in the same manner as in Example 2 except that Disperbyk161 (manufactured by BYK Japan KK) (solid content: 30% by weight in an organic solvent)) as the pigment dispersing agent. In Comparative Example 10, a red pigment dispersion solution was prepared in the same manner as in Example 2 except that Disperbyk2000 (manufactured by BYK Japan KK) (solid content: 30% by weight in an organic solvent)) as the pigment dispersing agent. In Comparative Example 11, a red pigment dispersion solution was prepared in the same manner as in Example 3 except that Disperbyk161 (manufactured by BYK Japan KK) (solid content: 30% by weight in an organic solvent)) as the pigment dispersing agent. In Comparative Example 12, a red pigment dispersion solution was prepared in the same manner as in Example 3 except that Disperbyk2000 (manufactured by BYK Japan KK) (solid content: 30% by weight in an organic solvent)) as the pigment dispersing agent.

The glass transition temperature of the pigment dispersing agent Disperbyk161 was measured in the same manner as that of Ajisper Pb821, to find that the glass transition temperature was 261° C. Also, the glass transition temperature of the pigment dispersing agent Disperbyk2000 was 194° C., when it was measured in the same manner as that of Ajisper Pb821.

(2) Preparation of a Binder

A binder composition was prepared in the same manner as in Example 1.

(3) Preparation of an Ink-Jet Ink

The PR254 pigment dispersion solution, PR177 pigment dispersion solution, PG36 pigment dispersion solution, PY150 pigment dispersion solution, PB15:6 pigment dispersion solution, PV23 pigment dispersion solution and binder composition prepared above were thoroughly mixed in the compounding ratio shown in Table 2 to prepare an ink-jet ink.

(4) Formation of a Coating Film

In Comparative Examples 1 to 4 and Comparative Examples 7 to 12, the formation of a coating film by using the spin coating method and the formation of a coating film by using the ink jet method were carried out in the same manner as in Example 1. In Comparative Example 5, the formation of a coating film by using the spin coating method and the formation of a coating film by using the ink jet method were carried out in the same manner as in Example 1 except that the film thickness of the black matrix was 1.2 μm. Also, in Comparative Example 6, the formation of a coating film by using the spin coating method and the formation of a coating film by using the ink jet method were carried out in the same manner as in Example 1 except that the film thickness of the black matrix was 3.2 μm.

(Evaluation)

The color filter obtained was evaluated as follows. The results of evaluation are also shown in Table 2.

1. As to a pixel, its average film thickness, distribution of film thickness and the ratio of the sum of areas of the regions where the film thickness is 1.5 μm or less and 2.5 μm or more As to the pixel, its average film thickness, distribution of film thickness, and the ratio of the sum of areas of the regions where the film thickness was 1.5 μm or less and 2.5 μm or more in one pixel were measured by a light interference three-dimensional non-contact surface shape measuring instrument (trade name: Micromap 557N, manufactured by Micromap, US).

The average film thickness (μm) of the pixel was found by measuring the film thickness at 1 μm intervals in all area of the pixel forming region to calculate an average of the measured thicknesses. The distribution of film thickness (μm) of the pixel was found by measuring the distribution of film thickness in the pixel forming region.

The ratio R of the sum of areas of the regions where the film thickness was 1.5 μm or less and 2.5 μm or more in one pixel was found based on the following equation.

$$R(\%) = (n_1 + n_2)/n_0 \times 100$$

wherein $n_1$ denotes the number of measured points where the film thickness is 1.5 μm or less, $n_2$ denotes the number of measured points where the film thickness is 2.5 μm or more and $n_0$ denotes the number of measured points in all area of the pixel forming region.

The ratio $R_1$ of the area of the regions where the film thickness is 1.5 μm or less in one pixel was found based on the following equation.

$$R_1(\%) = n_1/n_0 \times 100$$

wherein $n_1$ denotes the number of measured points where the film thickness is 1.5 μm or less and no denotes the number of measured points in all area of the pixel forming region.

The ratio $R_2$ of the area of the regions where the film thickness is 2.5 μm or more in one pixel was found based on the following equation.

$$R_2(\%) = n_2/n_0 \times 100$$

wherein $n_2$ denotes the number of measured points where the film thickness is 2.5 μm or more and no denotes the number of measured points in all area of the pixel forming region.

2. Chromaticity (x, y), Brightness Y and Brightness Loss

In a range of 1600 μm in the direction of the line and 200 μm in the direction perpendicular to the line among the pixel region of the color filter obtained in the examples, a region having a width of 4 mm and a height of 11 mm is set as the detection area of a sample to measure a spectral transmission spectrum in the visible wavelength region (400 to 700 nm) by using a wide area spectrometer (trade name: "Shimadzu Automatic Spectrophotometer UV-3100PC", manufactured by Shimadzu Corporation) and, from the results, the chromaticity $(x_1, y_1)$ and brightness $Y_1$ of the color filter (IJ-CE) which was obtained by the ink jet method and was a measuring subject and the chromaticity $(x_2, y_2)$ and brightness $Y_2$ of the color filter (SPIN-CF) which was obtained by the spin coating method were calculated.

Moreover, the brightness loss ΔY (%) was calculated based on the following equation.

$$\Delta Y(\%) = (Y_2 - Y_1)/Y_2 \times 100$$

When ΔY (%)≦5, it was decided that the color filter had an average film thickness enough to obtain sufficient color characteristics and was comparable to a color filter having a pixel with almost uniform thickness which was obtained by photolithography in brightness.

3. Film Properties (Solvent Resistance (Chemical Resistance))

The color filter obtained was dipped in N-methylpyrrolidone (NMP) at a liquid temperature of 40° C. for one hour to measure a color difference ΔEab before and after it was dipped. The color difference was measured according to the color difference equation of ΔEab established by CIE (Committee of Illumination Engineering) in 1976. Actual measurement was made by a microscopic spectral measuring device (trade name: OSP-SP100, manufactured by Olympus Corp.).

Also, the color filter obtained was dipped at a liquid temperature of 60° C. in isopropyl alcohol (IPA) for one hour to measure a color difference ΔEab before and after it was dipped, to find the color difference ΔEab.

A sample having good film properties was rated as 0 and a sample having unsatisfactory properties was rated as x. The criterion is as follows.

<Criterion>

The case where both ΔEab before and after dipping in IPA and ΔEab before and after dipping in NMP are 3 or less: o The case where one or both of ΔEab before and after dipping in IPA and ΔEab before and after dipping in NMP exceed 3: x 4. Patterning Characteristics As to the color filter having pixels, color mixing between the neighboring pixels was confirmed by a microscope. A sample having good patterning characteristics was rated as o and a sample having unsatisfactory patterning characteristics was rated as x. The criterion is as follows.

<Criterion>

The case where a braking-off phenomenon occurs: x

The case where no braking-off phenomenon occur: o

[Table 2]

TABLE 2

| | (Unit: weight %) | Example 1 | Example 2 | Example 3 | Example 4 | Comparative Example 1 | Comparative Example 2 |
|---|---|---|---|---|---|---|---|
| Pigment | C.I. Pigment Red 254 | 4.73 | — | — | 4.73 | 2.00 | 3.43 |
| | C.I. Pigment Red 177 | 3.15 | — | — | 3.15 | 1.33 | 2.29 |
| | C.I. Pigment Green 36 | — | 5.79 | — | — | — | — |
| | C.I. Pigment Yellow 150 | — | 3.40 | — | — | — | — |
| | C.I. Pigment Blue 15:6 | — | — | 4.87 | — | — | — |
| | C.I. Pigment Violet 23 | — | — | 0.31 | — | — | — |
| Pigment dispersing agent | Ajisper Pb821 | 4.73 | 5.51 | — | 4.73 | 2.00 | 3.43 |
| | Solsperse33000 | — | — | 3.11 | — | — | — |
| | byk161 | — | — | — | — | — | — |
| | byk2000 | — | — | — | — | — | — |
| Binder | Binder type epoxy compound | 2.77 | 1.99 | 4.39 | 2.77 | 5.50 | 4.07 |
| | Polyfunctional epoxy resin | 1.85 | 1.32 | 2.93 | 1.85 | 3.67 | 2.71 |
| | Neopentyl glycol glycidyl ether | 0.92 | 0.66 | 1.46 | 0.92 | 1.83 | 1.36 |
| | Trimellitic acid | 1.85 | 1.32 | 2.93 | 1.85 | 3.67 | 2.71 |
| Main solvent | BCA | 80 | 80 | 80 | 80 | 80 | 80 |
| | Total | 100.0 | 100.0 | 100.0 | 100.0 | 100.0 | 100.0 |
| | Leveling agent (wt %) | — | — | — | 0.5 | — | — |
| | Ink P/V ratio | R:0.65 | G:0.85 | B:0.35 | R:0.65 | R:0.2 | R:0.4 |
| | BM height(μm) | 2.2 | 2.2 | 2.2 | 2.2 | 2.2 | 2.2 |
| IJ-CF | Distribution of film thickness (μm) | 1.3~2.7 | 1.3~2.7 | 1.3~2.7 | 1.5~2.6 | 2.0~3.5 | 1.6~3.2 |
| | Average film thickness(μm) | 2.00 | 2.00 | 1.95 | 1.95 | 2.80 | 2.60 |
| | Film properties | o | o | o | o | o | o |
| | Patterning characteristics | o | o | o | o | x | o |
| | $R_1$(%) | 2 | 1 | 1 | 0 | 0 | 0 |
| | $R_2$(%) | 3 | 2 | 3 | 2 | 15 | 10 |
| | R(%) | 5 | 3 | 4 | 2 | 15 | 10 |

TABLE 2-continued

|  |  | | | | | |
|---|---|---|---|---|---|---|
| SPIN-CF | $x_1$ | 0.652 | 0.289 | 0.134 | 0.652 | Unmeasurable | 0.652 |
|  | $y_1$ | 0.331 | 0.600 | 0.110 | 0.331 | Unmeasurable | 0.327 |
|  | $Y_1$ | 18.2 | 52.3 | 12.2 | 18.5 | Unmeasurable | 17.4 |
|  | Film thickness (μm) | 1.65 | 1.65 | 1.65 | 1.65 | 1.65 | 2.26 |
|  | $x_2$ | 0.651 | 0.290 | 0.135 | 0.651 | 0.651 | 0.651 |
|  | $y_2$ | 0.330 | 0.599 | 0.111 | 0.330 | 0.330 | 0.330 |
|  | $Y_2$ | 19.1 | 55.1 | 12.6 | 19.1 | 19.1 | 19.2 |
|  | Brightness loss · Y (%) | 5 | 5 | 3 | 3 | Unmeasurable | 9 |

| (Unit: weight %) | | Comparative Example 3 | Comparative Example 4 | Comparative Example 5 | Comparative Example 6 | Comparative Example 7 |
|---|---|---|---|---|---|---|
| Pigment | C.I. Pigment Red 254 | 6.29 | 7.20 | 4.73 | 4.73 | 4.73 |
|  | C.I. Pigment Red 177 | 4.19 | 4.80 | 3.15 | 3.15 | 3.15 |
|  | C.I. Pigment Green 36 | — | — | — | — | — |
|  | C.I. Pigment Yellow 150 | — | — | — | — | — |
|  | C.I. Pigment Blue 15:6 | — | — | — | — | — |
|  | C.I. Pigment Violet 23 | — | — | — | — | — |
| Pigment dispersing agent | Ajisper Pb821 | 6.29 | 7.20 | 4.73 | 4.73 | — |
|  | Solsperse33000 | — | — | — | — | — |
|  | byk161 | — | — | — | — | 4.73 |
|  | byk2000 | — | — | — | — | — |
| Binder | Binder type epoxy compound | 1.21 | 0.30 | 2.77 | 2.77 | 2.77 |
|  | Polyfunctional epoxy resin | 0.81 | 0.20 | 1.85 | 1.85 | 1.85 |
|  | Neopentyl glycol glycidyl ether | 0.40 | 0.10 | 0.92 | 0.92 | 0.92 |
|  | Trimellitic acid | 0.81 | 0.20 | 1.85 | 1.85 | 1.85 |
| Main solvent | BCA | 80 | 80 | 80 | 80 | 80 |
|  | Total | 100.0 | 100.0 | 100.0 | 100.0 | 100.0 |
|  | Leveling agent (wt %) | — | — | — | — | — |
|  | Ink P/V ratio | R:1.1 | R:1.5 | R:0.65 | R:0.65 | R:0.65 |
|  | BM height (μm) | 2.2 | 2.2 | 1.2 | 3.2 | 2.2 |
| IJ-CF | Distribution of film thickness (μm) | 0.9~2.2 | 0.7~2.0 | 0.5~3.5 | 1.3~2.8 | 0.9~3.0 |
|  | Average film thickness (μm) | 1.70 | 1.60 | 2.30 | 2.10 | 2.15 |
|  | Film properties | ○ | x | ○ | ○ | ○ |
|  | Patterning characteristics | ○ | ○ | ○ | ○ | ○ |
|  | $R_1$ (%) | 10 | 10 | 12 | 5 | 4 |
|  | $R_2$ (%) | 0 | 0 | 7 | 2 | 3 |
|  | R (%) | 10 | 10 | 19 | 7 | 7 |
|  | $x_1$ | 0.652 | 0.652 | 0.652 | 0.652 | 0.652 |
|  | $y_1$ | 0.327 | 0.327 | 0.326 | 0.329 | 0.328 |
|  | $Y_1$ | 17.2 | 17.2 | 16.2 | 17.8 | 17.6 |
| SPIN-CF | Film thickness (μm) | 1.24 | 1.08 | 1.65 | 1.65 | 1.65 |
|  | $x_2$ | 0.651 | 0.651 | 0.651 | 0.651 | 0.651 |
|  | $y_2$ | 0.330 | 0.330 | 0.330 | 0.330 | 0.330 |
|  | $Y_2$ | 18.9 | 18.7 | 19.1 | 19.1 | 19.1 |
|  | Brightness loss · Y (%) | 10 | 10 | 15 | 7 | 8 |

| (Unit: weight %) | | Comparative Example 8 | Comparative Example 9 | Comparative Example 10 | Comparative Example 11 | Comparative Example 12 |
|---|---|---|---|---|---|---|
| Pigment | C.I. Pigment Red 254 | 4.73 | — | — | — | — |
|  | C.I. Pigment Red 177 | 3.15 | — | — | — | — |
|  | C.I. Pigment Green 36 | — | 5.79 | 5.79 | — | — |
|  | C.I. Pigment Yellow 150 | — | 3.40 | 3.40 | — | — |
|  | C.I. Pigment Blue 15:6 | — | — | — | 4.87 | 4.87 |
|  | C.I. Pigment Violet 23 | — | — | — | 0.31 | 0.31 |
| Pigment dispersing agent | Ajisper Pb821 | — | — | — | — | — |
|  | Solsperse33000 | — | — | — | — | — |
|  | byk161 | — | 5.51 | — | 3.11 | — |
|  | byk2000 | 4.73 | — | 5.51 | — | 3.11 |
| Binder | Binder type epoxy compound | 2.77 | 1.99 | 1.99 | 4.39 | 4.39 |
|  | Polyfunctional epoxy resin | 1.85 | 1.32 | 1.32 | 2.93 | 2.93 |
|  | Neopentyl glycol glycidyl ether | 0.92 | 0.66 | 0.66 | 1.46 | 1.46 |
|  | Trimellitic acid | 1.85 | 1.32 | 1.32 | 2.93 | 2.93 |
| Main solvent | BCA | 80 | 80 | 80 | 80 | 80 |
|  | Total | 100.0 | 100.0 | 100.0 | 100.0 | 100.0 |
|  | Leveling agent (wt %) | — | — | — | — | — |
|  | Ink P/V ratio | R:0.65 | G:0.85 | G:0.85 | B:0.35 | B:0.35 |
|  | BM height (μm) | 2.2 | 2.2 | 2.2 | 2.2 | 2.2 |
| IJ-CF | Distribution of film thickness (μm) | 0.9~3.0 | 0.9~3.0 | 0.9~3.0 | 1.0~2.8 | 1.0~2.8 |
|  | Average film thickness (μm) | 2.15 | 2.15 | 2.20 | 2.10 | 2.10 |
|  | Film properties | ○ | ○ | ○ | ○ | ○ |
|  | Patterning characteristics | ○ | ○ | ○ | ○ | ○ |
|  | $R_1$ (%) | 4 | 8 | 8 | 3 | 3 |
|  | $R_2$ (%) | 3 | 7 | 7 | 3 | 3 |
|  | R (%) | 7 | 15 | 15 | 6 | 6 |

TABLE 2-continued

|   |   |   |   |   |   |   |
|---|---|---|---|---|---|---|
|  | $x_1$ | 0.652 | 0.286 | 0.286 | 0.134 | 0.134 |
|  | $y_1$ | 0.328 | 0.600 | 0.600 | 0.110 | 0.110 |
|  | $Y_1$ | 17.6 | 48.5 | 48.5 | 11.4 | 11.7 |
| SPIN-CF | Film thickness(μm) | 1.65 | 1.65 | 1.65 | 1.65 | 1.65 |
|  | $x_2$ | 0.651 | 0.290 | 0.290 | 0.135 | 0.135 |
|  | $y_2$ | 0.330 | 0.599 | 0.599 | 0.111 | 0.111 |
|  | $Y_2$ | 19.1 | 55.1 | 55.1 | 12.3 | 12.6 |
|  | Brightness loss · Y (%) | 8 | 12 | 12 | 7 | 7 |

<Summary of the Result>

With regard to the color filters obtained by the ink jet system in Examples 1 to 4 according to the present invention, the distribution of film thickness and the ratio of the sum of the areas of the regions where the film thickness is 1.5 μm or less and 2.5 μm or more are within the ranges of the present invention. Therefore, the shape of a pixel is near flat and the brightness loss is small. Accordingly, these color filters according to the present inventions have less reduction in brightness in contrast with a color filter having a pixel which has an average film thickness enough to obtain sufficient color characteristics and is obtained by the spin coating method enabling almost uniform thickness to be obtained. Also, the color filters according to the present invention are superior in film properties and patterning characteristics.

The ink jet color filter of Example 4 using an ink-jet ink obtained by further adding a leveling agent in the ink-jet ink of Example 1 is superior in the point that it has a lower brightness loss than Example 1.

On the other hand, the red color filter obtained by the ink jet system in each of Comparative Examples 1 and 2 in which the P/V ratio of the ink is less than the range defined in the present invention and the average film thickness exceeds the range of the present invention has a distribution of film thickness in the region higher than 3.0 μm and the ratio of the sum of the areas of the regions where the film thickness is 1.5 μm or less and 2.5 μm or more is high and therefore, the pixel has inferior flatness. Also, these color filters are reduced in brightness more significantly than the color filter obtained by the spin coating method. Moreover, in Comparative Example 1, when a trial was made to pattern a desired color density, an ink break phenomenon occurred.

The red color filters obtained using the ink jet system in Comparative Examples 3 and 4 in which the P/V ratio of the ink is larger than the range defined in the present invention has a distribution of film thickness in the region less than 1.0 μm and the ratio of the sum of the areas of the regions where the film thickness is 1.5 μm or less and 2.5 μm or more is high and therefore, the pixel has inferior flatness. Also, these color filters are reduced in brightness more significantly than the color filter obtained by the spin coating method. Moreover, the film properties are deteriorated in Comparative Example 4.

Though the ink used and average film thickness are the same as those of Example 1, the red color filter obtained by the ink jet system in Comparative Example 5 in which the height of the black matrix layer is less than 2.0 μm has a distribution of the film thickness in the region less than 1.0 μm and exceeding 3.0 μm and has such a shape that the film thickness in the vicinity of the edge of the pixel is greatly dropped whereas there is a great rise in the center part, so that the color filter is reduced in brightness more significantly than a color filter obtained by the spin coating method.

Though the ink used and average film thickness are the same as those of Example 1, the red color filter obtained by the ink jet system in Comparative Example 6 in which the height of the black matrix layer exceeds 3.0 μm has the characteristics that the ratio of the total area of the region where the film thickness is 1.5 μm or less and 2.5 μm or more is high, thus bringing about inferior pixel flatness. Also, as compared with a color filter obtained by the spin coating method, a reduction in brightness is observed.

Though the ink used, average film thickness and the height of the black matrix are the same as those of Example 1, the red color filter obtained by the ink jet system in each of Comparative Examples 7 and 8 in which the lower limit of the range of the distribution of film thickness is lower than the range defined by the present invention has the characteristics that the ratio of the total area of the region where the film thickness is 1.5 μm or less and 2.5 μm or more is high, thus bringing about inferior pixel flatness. Also, as compared with a color filter obtained by the spin coating method, a reduction in brightness is observed.

Though the ink used, average film thickness and the height of the black matrix are the same as those of Example 2, the green color filter obtained by the ink jet system in each of Comparative Examples 9 and 10 in which the lower limit of the range of the distribution of film thickness is lower than the range defined by the present invention has the characteristics that the ratio of the total area of the region where the film thickness is 1.5 μm or less and 2.5 μm or more is high, thus bringing about inferior pixel flatness. Also, as compared with a color filter obtained by the spin coating method, a reduction in brightness is observed.

Though the ink used, average film thickness and the height of the black matrix are the same as those of Example 3, the green color filter obtained by the ink jet system in each of Comparative Examples 11 and 12 in which the lower limit of the range of the distribution of film thickness is lower than the range defined by the present invention has the characteristics that the ratio of the total area of the region where the film thickness is 1.5 μm or less and 2.5 μm or more is high, thus bringing about inferior pixel flatness. Also, as compared with a color filter obtained by the spin coating method, a reduction in brightness is observed.

The invention claimed is:

1. A color filter comprising at least a transparent substrate and pixels containing a pigment, a pigment dispersing agent and a binder, wherein the pigment dispersing agent contains a polyethylimine derivative or polyallylamine derivative, wherein each of the pixels has a sectional shape in which there is a rise in the vicinity of the center and has an average film thickness range from 1.5 μm to 2.5 μm and a film thickness distribution range from 1.0 μm to 3.0 μm, wherein the ratio of the total area of the regions having a film thickness of 1.5 μm or less or 2.5 μm or more in one pixel is 5% or less, and wherein the binder contains a reaction product of an epoxy compound having two or more epoxy groups in its molecule, wherein the ratio (P/V ratio) of the weight of the pigment and the sum of the weights of the dispersing agent and the binder is 0.5 to 1.0 in R pixel, 0.5 to 1.2 in G pixel and 0.3 to 0.5 in B pixel.

2. The color filter according to claim 1, wherein the distribution of film thickness of each pixel is in a range from 1.5 µm to 2.5 µm.

3. The color filter according to claim 1, wherein the color filter has a black matrix layer having a height of 2.0 µm to 3.0 µm.

4. The color filter according to claim 1, wherein the pixel contains a leveling agent.

5. The color filter according to claim 1, wherein the pigment dispersing agent has a glass transition temperature of 200° C. or less.

6. A method of producing a color filter, comprising:

a step (A) of preparing an ink-jet ink for color filter, the ink containing a pigment, a pigment dispersing agent, a binder forming system and a solvent, wherein the solvent contains, as its main solvent, a solvent component having a boiling point of 180° C. to 260° C. and a vapor pressure of 0.5 mm Hg or less at ordinary temperature in a ratio of 60% by weight or more based on the total amount of the solvent, the ratio (PN ratio) of the weight of the pigment and the sum of the weights of the pigment dispersing agent and the binder forming system is 0.5 to 1.0 when an R pixel is formed, 0.5 to 1.2 when a G pixel is formed and 0.3 to 0.5 when a B pixel is formed and the concentration of a solid based on the total weight of the ink is 15% by weight to 25% by weight;

a step (B) of forming an R ink layer, a G ink layer and a B ink layer respectively by making the R pixel forming ink, the G pixel forming ink and the B pixel forming ink obtained by the step (A) selectively adhere on each predetermined area of a transparent substrate by the ink-jet method; and a step (C) of curing each of the ink layer to form an R pixel, a G pixel and a B pixel which each have an average film thickness range from 1.5 µm to 2.5 µm and a film thickness distribution range from 1.0 µm to 3.0 µm, wherein the ratio of the total area of the regions having a film thickness of 1.5 µm or less or 2.5 µm or more in one pixel is 5% or less, and wherein the binder contains a reaction product of an epoxy compound having two or more epoxy groups in its molecule.

7. The method of producing a color filter according to claim 6, wherein the pigment dispersing agent contains a polyethyleneimine derivative or a polyallylamine derivative.

8. The method of producing a color filter according to claim 6, wherein the each pixel has a film thickness distribution range from 1.5 µm to 2.5 µm.

9. The method of producing a color filter according to claim 6, wherein the color filter has a black matrix layer having a height of 2.0 µm to 3.0 µm.

10. The method of producing a color filter according to claim 6, wherein the ink-jet ink for color filter contains a leveling agent.

11. The method of producing a color filter according to claim 10, wherein the leveling agent is added after the step of dispersing the pigment.

* * * * *